(12) United States Patent
Balakrishnan et al.

(10) Patent No.: US 10,991,012 B2
(45) Date of Patent: Apr. 27, 2021

(54) CREATIVE BRIEF-BASED CONTENT CREATION

(71) Applicant: Adobe Inc., San Jose, CA (US)

(72) Inventors: Govind P. Balakrishnan, Foster City, CA (US); Pradeep Saikalyanachakravarthi Javangula, San Jose, CA (US); Oliver Isaac Goldman, Seattle, WA (US); Kevin Gary Smith, Lehi, UT (US); Ashley Manning Still, Atherton, CA (US)

(73) Assignee: Adobe Inc., San Jose, CA (US)

( * ) Notice: Subject to any disclaimer, the term of this patent is extended or adjusted under 35 U.S.C. 154(b) by 409 days.

(21) Appl. No.: 15/801,173

(22) Filed: Nov. 1, 2017

(65) Prior Publication Data

US 2019/0130458 A1     May 2, 2019

(51) Int. Cl.
*G06Q 30/02*     (2012.01)
*G06N 20/00*     (2019.01)

(52) U.S. Cl.
CPC ......... *G06Q 30/0276* (2013.01); *G06N 20/00* (2019.01); *G06Q 30/0202* (2013.01)

(58) Field of Classification Search
CPC . G06Q 30/0207–0277; G06Q 30/0276; G06Q 30/0202; G06N 20/00
See application file for complete search history.

(56) References Cited

U.S. PATENT DOCUMENTS

| | | | |
|---|---|---|---|
| 6,922,699 B2 | 7/2005 | Schuetze et al. | |
| 7,882,045 B1 * | 2/2011 | Cole | G06Q 30/0254 706/12 |
| 8,442,683 B2 | 5/2013 | Lee | |
| 8,566,712 B1 | 10/2013 | Varian | |
| 8,752,112 B2 | 6/2014 | Krasic et al. | |
| 9,117,227 B1 * | 8/2015 | Agrawal | G06Q 30/0242 |

(Continued)

FOREIGN PATENT DOCUMENTS

WO    WO-2015027223     2/2015

OTHER PUBLICATIONS

TechTerms, Global Unique Identifier, Oct. 13, 2008.*

(Continued)

*Primary Examiner* — David J Stoltenberg
(74) *Attorney, Agent, or Firm* — FIG. 1 Patents

(57) ABSTRACT

Creative brief-based content creation is described. A service provider system, such as a creative service provider system, supports the creation of digital content in connection with digital content creation projects. Initially, the service provider system defines a schema as a set of rules for controlling configuration of creative briefs to register digital content creation projects. The service provider system provides service to support digital content creation based on the data included in the creative briefs. For instance, the service provider system provides service by leveraging the descriptive data configured according to the set of rules defined by the schema, which specify particular attributes that are to be instantiated to describe digital content creation projects. Example services include surfacing mockup digital content to inspire content creators, surfacing content scores indicative of how the digital content being created is predicted to perform in relation to target demographic groups, and so on.

20 Claims, 9 Drawing Sheets

(56) References Cited

U.S. PATENT DOCUMENTS

| | | |
|---|---|---|
| 9,134,978 B1 | 9/2015 | Roskind |
| 9,152,624 B1 | 10/2015 | Krallman et al. |
| 9,367,524 B1 | 6/2016 | Filev et al. |
| 9,396,483 B2 | 7/2016 | Hamedi |
| 9,554,093 B2 | 1/2017 | Hua et al. |
| 9,646,227 B2 | 5/2017 | Suri et al. |
| 9,736,503 B1 | 8/2017 | Bakshi et al. |
| 9,811,590 B1 | 11/2017 | Acharya et al. |
| 10,339,173 B2 | 7/2019 | Kelley et al. |
| 10,341,199 B2 | 7/2019 | Peri et al. |
| 10,600,075 B2 | 3/2020 | Fabbri et al. |
| 10,657,118 B2 | 5/2020 | Miller et al. |
| 10,685,375 B2 | 6/2020 | Goldman et al. |
| 10,733,262 B2 | 8/2020 | Miller et al. |
| 10,795,647 B2 | 10/2020 | Jacobs et al. |
| 10,853,766 B2 | 12/2020 | Balakrishnan et al. |
| 10,943,257 B2 | 3/2021 | Goldman et al. |
| 2001/0035873 A1 | 11/2001 | Easter |
| 2002/0107926 A1 | 8/2002 | Lee |
| 2002/0150295 A1 | 10/2002 | Kwok et al. |
| 2004/0133081 A1 | 7/2004 | Teller et al. |
| 2005/0002586 A1 | 1/2005 | Liege et al. |
| 2005/0033657 A1 | 2/2005 | Herrington et al. |
| 2006/0048092 A1 | 3/2006 | Kirkley |
| 2006/0080314 A1 | 4/2006 | Hubert et al. |
| 2006/0085255 A1 | 4/2006 | Hastings et al. |
| 2007/0033093 A1 | 2/2007 | Divine et al. |
| 2007/0250901 A1 | 10/2007 | McIntire |
| 2008/0040318 A1* | 2/2008 | Stanis ............... G06T 11/60 |
| 2008/0120646 A1 | 5/2008 | Stern et al. |
| 2008/0215509 A1 | 9/2008 | Charlton |
| 2008/0249855 A1* | 10/2008 | Collins ............... G06Q 30/00 705/14.54 |
| 2009/0006467 A1 | 1/2009 | Visscher |
| 2009/0079871 A1 | 3/2009 | Hua et al. |
| 2009/0092374 A1 | 4/2009 | Kulas |
| 2009/0144129 A1* | 6/2009 | Grouf ............... G06F 21/10 705/14.42 |
| 2010/0017885 A1* | 1/2010 | Cohen ............... H04N 21/4627 726/26 |
| 2010/0023393 A1 | 1/2010 | Costy |
| 2010/0050098 A1 | 2/2010 | Turner |
| 2010/0118035 A1 | 5/2010 | Yamakami |
| 2010/0120402 A1* | 5/2010 | Sethi ............... H04L 67/1095 455/414.1 |
| 2011/0040611 A1* | 2/2011 | Simmons ........... G06Q 30/0275 705/14.41 |
| 2011/0153414 A1 | 6/2011 | Elvekrog et al. |
| 2011/0239253 A1 | 9/2011 | West et al. |
| 2011/0258036 A1* | 10/2011 | Ioffe ............... G06Q 30/0247 705/14.43 |
| 2011/0320441 A1 | 12/2011 | Lee et al. |
| 2012/0054596 A1 | 3/2012 | Kroger et al. |
| 2012/0109609 A1 | 5/2012 | Weber et al. |
| 2012/0116868 A1 | 5/2012 | Chin et al. |
| 2012/0130802 A1* | 5/2012 | Shimizu ............... G06Q 30/0245 705/14.44 |
| 2012/0272160 A1 | 10/2012 | Spivack et al. |
| 2013/0159110 A1 | 6/2013 | Rajaram et al. |
| 2013/0304604 A1 | 11/2013 | Hoffman et al. |
| 2014/0040067 A1 | 2/2014 | England et al. |
| 2014/0046777 A1* | 2/2014 | Markey ............... G06Q 30/0269 705/14.66 |
| 2014/0047335 A1 | 2/2014 | Lewis et al. |
| 2014/0114746 A1* | 4/2014 | Pani ............... G06Q 10/067 705/14.45 |
| 2014/0130076 A1 | 5/2014 | Moore et al. |
| 2014/0156379 A1* | 6/2014 | Pani ............... G06Q 30/0242 705/14.41 |
| 2014/0156416 A1* | 6/2014 | Goenka ............... G06Q 30/0276 705/14.66 |
| 2014/0200989 A1 | 7/2014 | Cohen Kassko et al. |
| 2014/0324604 A1* | 10/2014 | Munoz Torres ... G06Q 30/0276 705/14.72 |
| 2014/0372901 A1 | 12/2014 | Catlin et al. |
| 2015/0006295 A1 | 1/2015 | Liu et al. |
| 2015/0100377 A1 | 4/2015 | Penumaka et al. |
| 2015/0112980 A1* | 4/2015 | Sanio ............... G06Q 30/0242 707/728 |
| 2015/0161648 A1* | 6/2015 | Heath ............... G06Q 30/0201 705/14.36 |
| 2015/0324867 A1 | 11/2015 | Jalili |
| 2015/0379557 A1* | 12/2015 | Liu ............... G06Q 30/0244 705/14.43 |
| 2016/0007083 A1 | 1/2016 | Gurha |
| 2016/0019243 A1* | 1/2016 | Kamel ............... G06Q 30/0241 707/737 |
| 2016/0078520 A1 | 3/2016 | Nice et al. |
| 2016/0086215 A1* | 3/2016 | Wang ............... G06Q 30/0246 705/14.45 |
| 2016/0189201 A1* | 6/2016 | Shao ............... G06Q 30/0243 705/14.42 |
| 2016/0286244 A1 | 9/2016 | Chang et al. |
| 2016/0300135 A1 | 10/2016 | Moudy et al. |
| 2016/0335339 A1 | 11/2016 | Venkataraman et al. |
| 2016/0379244 A1* | 12/2016 | Kalish ............... G06Q 30/0242 705/14.41 |
| 2017/0017986 A1* | 1/2017 | Mathis ............... G06Q 30/0242 |
| 2017/0032483 A1* | 2/2017 | Steelberg ............... G06F 3/0484 |
| 2017/0061500 A1* | 3/2017 | Borodin ............... G06Q 30/0273 |
| 2017/0078350 A1* | 3/2017 | Gordon ............... H04L 65/80 |
| 2017/0098236 A1* | 4/2017 | Lee ............... G06Q 30/0244 |
| 2017/0099525 A1* | 4/2017 | Ray ............... H04N 21/252 |
| 2017/0140283 A1* | 5/2017 | Cheng ............... G06N 20/00 |
| 2017/0161773 A1* | 6/2017 | Xu ............... G06F 16/2455 |
| 2017/0161794 A1* | 6/2017 | Zhu ............... G06Q 30/02 |
| 2017/0220694 A1* | 8/2017 | Vaish ............... G06F 16/9535 |
| 2017/0337234 A1* | 11/2017 | Goldman ............... G06F 16/235 |
| 2018/0004847 A1* | 1/2018 | Kulkarni ............... G06F 16/9535 |
| 2018/0012253 A1* | 1/2018 | Gavlovski ............... G06Q 30/0276 |
| 2018/0040019 A1* | 2/2018 | Gavlovski ............... G06Q 30/0255 |
| 2018/0040029 A1* | 2/2018 | Zeng ............... G06Q 30/0269 |
| 2018/0060921 A1* | 3/2018 | Mengle ............... G06Q 30/0276 |
| 2018/0101611 A1 | 4/2018 | McDevitt et al. |
| 2018/0109612 A1 | 4/2018 | Zhong et al. |
| 2018/0189074 A1* | 7/2018 | Kulkarni ............... G06F 9/451 |
| 2018/0189822 A1* | 7/2018 | Kulkarni ............... G06Q 30/0244 |
| 2018/0189843 A1* | 7/2018 | Kulkarni ............... G06Q 30/0244 |
| 2018/0225705 A1 | 8/2018 | Ferber et al. |
| 2018/0240152 A1* | 8/2018 | Mookherjee ............... G06Q 30/0254 |
| 2018/0276720 A1* | 9/2018 | Yang ............... G06Q 30/0276 |
| 2018/0300046 A1 | 10/2018 | Goyal et al. |
| 2019/0034809 A1* | 1/2019 | Xu ............... G06N 5/022 |
| 2019/0034976 A1* | 1/2019 | Hamedi ............... G06Q 30/0204 |
| 2019/0080019 A1* | 3/2019 | Young ............... G06F 16/958 |
| 2019/0080347 A1* | 3/2019 | Smith ............... G06Q 30/0269 |
| 2019/0095945 A1 | 3/2019 | Fabbri et al. |
| 2019/0095949 A1* | 3/2019 | Chien ............... G06Q 30/0255 |
| 2019/0108250 A1 | 4/2019 | Miller et al. |
| 2019/0108288 A1 | 4/2019 | Miller et al. |
| 2019/0114151 A1 | 4/2019 | Jacobs et al. |
| 2019/0114663 A1* | 4/2019 | Goldman ............... G06Q 30/0244 |
| 2019/0114664 A1* | 4/2019 | Goldman ............... G06Q 30/0244 |
| 2019/0114672 A1 | 4/2019 | Jacobs et al. |
| 2019/0114680 A1 | 4/2019 | Chien et al. |
| 2019/0130356 A1 | 5/2019 | Balakrishnan et al. |
| 2019/0164082 A1* | 5/2019 | Wu ............... G06N 20/00 |
| 2019/0205919 A1* | 7/2019 | Goksel ............... G06Q 30/0242 |
| 2019/0279260 A1* | 9/2019 | Carpita ............... G06F 16/638 |
| 2020/0021873 A1* | 1/2020 | Swaminathan .... G06Q 30/0242 |
| 2020/0218709 A1 | 7/2020 | Miller |
| 2020/0265463 A1 | 8/2020 | Goldman et al. |
| 2020/0401380 A1 | 12/2020 | Jacobs et al. |

OTHER PUBLICATIONS

How Artificial Intelligence and Machine Learning Will Change Content Creation Methodologies, Tom Ohanian, SMPTE 2017 Annual Technical Conference & Exhibition.*

Automated Advertisement Creation System, Frey et al., IPCOM000251275D, IP.com Electronic Publication Date: Oct. 29, 2017.*

(56) References Cited

OTHER PUBLICATIONS

Deep Neural Network-Based Click-Through Rate Prediction Using Multimodal Features of Online Banners, Xia et al., 2019 IEEE Fifth International Conference on Multimedia Big Data (BigMM), 978-1-7281-5527-2/19/$31.00 © 2019 IEEE.*
Forrest,"How Google wants to crowdsource machine learning with smartphones and Federated Learning", Retrieved at: https://www.techrepublic.com/article/how-google-wants-to-crowdsource-machine-learning-with-smartphones-and-federated-learning/, Apr. 7, 2017, 10 pages.
McMahan,"Communication-Efficient Learning of Deep Networks from Decentralized Data", Proceedings of the 20 the International Conference on Artificial Intelligence and Statistics (AISTATS) 2017. JMLR: W&CP vol. 54, Feb. 28, 2017, 11 pages.
"Final Office Action", U.S. Appl. No. 15/785,298, dated Apr. 17, 2019, 24 pages.
"Pre-Interview First Office Action", U.S. Appl. No. 15/716,348, dated Jan. 29, 2019, 3 pages.
"First Action Interview Office Action", U.S. Appl. No. 15/716,348, dated Feb. 20, 2019, 3 pages.
"Pre-Interview First Office Action", U.S. Appl. No. 15/726,168, dated Mar. 19, 2019, 7 pages.
"Non-Final Office Action", U.S. Appl. No. 15/785,298, dated Sep. 14, 2018, 17 pages.
"Restriction Requirement", U.S. Appl. No. 15/785,298, dated Jul. 19, 2018, 7 pages.
"Final Office Action", U.S. Appl. No. 15/716,348, dated Jul. 23, 2019, 25 pages.
"Final Office Action", U.S. Appl. No. 15/726,125, dated Sep. 13, 2019, 11 pages.
"First Action Interview Office Action", U.S. Appl. No. 15/726,168, dated Jun. 28, 2019, 6 pages.
"First Action Interview Office Action", U.S. Appl. No. 15/783,228, dated Aug. 22, 2019, 8 pages.
"Pre-Interview First Office Action", U.S. Appl. No. 15/726,125, dated Jul. 11, 2109, 7 pages.
"Pre-Interview First Office Action", U.S. Appl. No. 15/782,457, dated Sep. 11, 2019, 4 pages.
"Pre-Interview First Office Action", U.S. Appl. No. 15/783,228, dated Jul. 8, 2019, 8 pages.
"Restriction Requirement", U.S. Appl. No. 15/782,517, dated Jul. 11, 2019, 7 pages.
Foley,"How to Get WordPress Rotating Header Images", Apr. 19, 2013, 14 pages.
"Pre-Interview First Office Action", U.S. Appl. No. 15/785,298, dated Sep. 21, 2018, 4 pages.
"First Action Interview Office Action", U.S. Appl. No. 15/785,298, dated Oct. 1, 2018, 4 pages.
"Final Office Action", U.S. Appl. No. 15/783,228, dated Oct. 24, 2019, 23 pages.
"Pre-Interview First Office Action", U.S. Appl. No. 15/713,339, dated Aug. 8, 2019, 3 pages.
"First Action Interview Office Action", U.S. Appl. No. 15/782,457, dated Oct. 29, 2019, 3 pages.
"Final Office Action", U.S. Appl. No. 15/726,168, dated Dec. 11, 2019, 11 pages.
"Non-Final Office Action", U.S. Appl. No. 15/782,517, dated Dec. 12, 2019, 30 pages.
"Non-Final Office Action", U.S. Appl. No. 15/785,298, dated Dec. 9, 2019, 11 pages.
"Notice of Allowance", U.S. Appl. No. 15/713,339, dated Nov. 25, 2019, 13 pages.
"Notice of Allowance", U.S. Appl. No. 15/726,125, dated Jan. 8, 2020, 8 pages.
"Notice of Allowance", U.S. Appl. No. 15/782,457, dated Feb. 7, 2020, 14 pages.
"Corrected Notice of Allowability", U.S. Appl. No. 15/726,125, dated Mar. 18, 2020, 2 pages.
"Corrected Notice of Allowability", U.S. Appl. No. 15/726,125, dated Apr. 24, 2020, 2 pages.
"First Action Interview Office Action", U.S. Appl. No. 15/801,090, dated Apr. 14, 2020, 4 pages.
"Non-Final Office Action", U.S. Appl. No. 15/716,348, dated Mar. 25, 2020, 26 pages.
"Non-Final Office Action", U.S. Appl. No. 15/783,228, dated Apr. 17, 2020, 30 pages.
"Non-Final Office Action", U.S. Appl. No. 15/801,090, dated Mar. 10, 2020, 26 pages.
"Notice of Allowance", U.S. Appl. No. 15/726,168, dated Mar. 26, 2020, 9 pages.
"Notice of Allowance", U.S. Appl. No. 15/785,298, dated Jun. 1, 2020, 7 pages.
"Pre-Interview First Office Action", U.S. Appl. No. 15/801,090, dated Mar. 16, 2020, 5 pages.
"Notice of Allowance", U.S. Appl. No. 15/801,090, dated Aug. 13, 2020, 15 pages.
"Corrected Notice of Allowability", U.S. Appl. No. 15/785,298, dated Aug. 27, 2020, 2 pages.
"Corrected Notice of Allowability", U.S. Appl. No. 15/785,298, dated Sep. 10, 2020, 2 pages.
"Final Office Action", U.S. Appl. No. 15/716,348, dated Aug. 7, 2020, 28 pages.
"Final Office Action", U.S. Appl. No. 15/782,517, dated Aug. 7, 2020, 38 pages.
Thai,"The GACTS of life: how we mastered the marketing brief", https://wavelength.asana.com/workstyle-gacts-mastered-marketing-brief/#close, Apr. 28, 2016, 11 pages.
"Examiner's Answer", U.S. Appl. No. 15/783,228, dated Sep. 29, 2020, 20 pages.
"Notice of Allowability", U.S. Appl. No. 16/867,321, dated Dec. 7, 2020, 2 pages.
"Notice of Allowance", U.S. Appl. No. 16/867,321, dated Oct. 5, 2020, 8 pages.
"Pre-Interview First Office Action", U.S. Appl. No. 16/827,413, dated Nov. 25, 2020, 4 pages.
"Supplemental Notice of Allowability", U.S. Appl. No. 15/801,090, dated Oct. 23, 2020, 2 pages.
Benjamin, Dan , "Random Image Rotation", A List Apart Blog [retrieved Nov. 25, 2020]. Retrieved from the Internet <https://alistapart.com/article/randomizer/>., Oct. 20, 2003, 28 pages.
"Corrected Notice of Allowability", U.S. Appl. No. 16/867,321, dated Jan. 6, 2021, 2 pages.
"Corrected Notice of Allowability", U.S. Appl. No. 16/867,321, dated Feb. 12, 2021, 2 pages.
"Pre-Interview First Office Action", U.S. Appl. No. 15/785,329, dated Jan. 25, 2021, 4 pages.

* cited by examiner

CREATIVE BRIEF-BASED CONTENT CREATION

BACKGROUND

Oftentimes, creation of content assets for marketing campaigns is initiated with a "creative brief," which a marketer of a company supplies to a third-party advertising agency or in-house department. Based on the creative brief, the advertising agency creates advertising content and then provides the advertising content so that it can be delivered via any of a variety of channels. Broadly speaking, a "creative brief" is a document or some other instrument capable of conveying information about the marketing campaign and that content creators can refer to when creating a content asset for the campaign. Examples of the types of information in a creative brief include a product or service with which the marketing campaign is associated (e.g., a product or service the marketing campaign is designed to sell), a budget for the marketing campaign, an expected performance of the marketing campaign, and so forth.

Conventional techniques for conveying this information often involve an individual (e.g., a marketer) simply drafting a description with such information in a word-processing document. This document is then communicated to the content creator, e.g., third-party advertising agency. Beyond an initial review, however, content creators do not often refer to conventionally configured creative briefs. As a result, creative briefs may be abandoned over the course of a campaign's lifetime. This occurs because conventional creative service systems fail to leverage the information of creative briefs.

One consequence of failing to leverage this information is that created content deviates from an intended purpose. Due to this deviation, some customers (e.g., marketers) of content creators (e.g., advertising agencies) are dissatisfied with the created content. Moreover, creation of conventionally configured creative briefs can be tedious for a user. This tediousness is accentuated by the fact that these briefs oftentimes provide little information that content creators actually use to produce effective content, e.g., to cause conversion of a product or service. Instead, these content creators generally rely on other sources of information such as personal knowledge. Accordingly, conventional creative brief techniques may hamper content creation and cause the digital content created in association therewith to fail for its intended purpose, such as to cause conversion by digital marketing content from a digital marketing system.

SUMMARY

To overcome these problems, creative brief-based content creation is leveraged in a digital medium environment. A service provider system, such as a creative service provider system, supports the creation of digital content in connection with digital content creation projects (e.g., digital marketing campaigns) by employing the creative brief schema. Initially, the service provider system defines the schema as a set of rules for controlling configuration of creative briefs to register digital content creation projects. The service provider system is configured to provide service to support digital content creation based on the data included in the creative briefs. For instance, the service provider system provides service by leveraging the descriptive data configured according to the set of rules defined by the schema, which specify particular attributes that are to be instantiated to describe digital content creation projects. Examples of these attributes include a brief identifier, a brief name, associated products or services, creative spend, expected performance, audience demographics, delivery channels, mood, and so forth. Example services include surfacing mockup digital content to inspire a content creator, surfacing content scores indicative of how the digital content being created is predicted to perform in relation to a target demographic segment, and so on.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
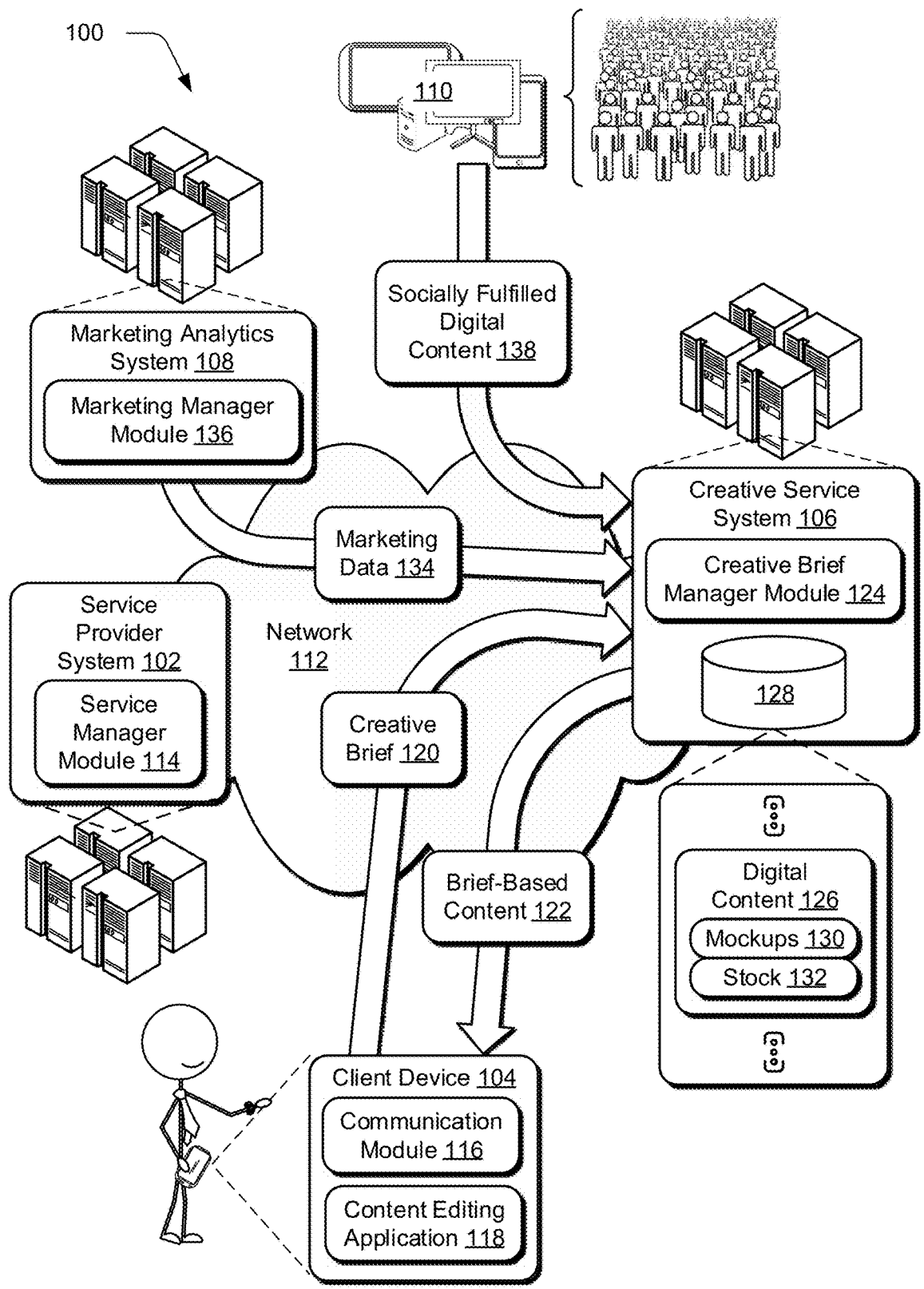
FIG. 1 is an illustration of an environment in an example implementation that is operable to employ techniques described herein.

Conventional techniques for conveying information about a content creation project, such as a marketing campaign, often involve an individual (e.g., a marketer) simply drafting a description with such information in a word-processing document. This document is then communicated to the content creator, e.g., third-party advertising agency. Beyond an initial review, however, content creators do not often refer to conventionally configured creative briefs. As a result, conventional creative briefs may be ignored over the course of a campaign's lifetime, even though such briefs contain potentially useful information. This occurs because conventional creative service systems fail to leverage the information of creative briefs. Indeed, these systems fail even to expose mechanisms by which creative briefs can be provided (e.g., uploaded to the system) so that the included information can be analyzed and service provided based on the analyzed information.

To overcome these problems, a service provider system, such as a creative-service provider system, leverages creative briefs in a digital medium environment. As part of this, the service provider system employs a creative brief schema for controlling a format of creative briefs. In other words, the schema is employed to standardize a format of creative briefs. Broadly speaking, the service provider system leverages the creative briefs to support the creation of digital content in connection with digital content creation projects, e.g., digital marketing campaigns. Initially, the service provider system defines the schema as a set of rules to control configuration of the creative briefs to register digital content projects for support. The service provider system is configured to provide service to support digital content creation based on the data included in the creative briefs. For instance, the service provider system provides service by leveraging descriptive data of creative briefs configured according to the set of rules defined by the schema, which specify particular attributes that are to be instantiated to describe digital content creation projects. Examples of these attributes include a brief identifier, a brief name, associated products or services, creative spend, expected performance, audience demographics, delivery channels, mood, and so forth.

To provide support services for a digital content creation project, a creative brief having data configured according to the set of rules defined by the schema is generated. This creative brief data describes the digital content creation project in a manner specified by the schema. In one or more implementations, a client device generates such a creative brief based on user input (e.g., from a marketer) specifying values for the various attributes of the digital content creation project. By way of example, user input indicating an intent of, and a budget for, the digital content creation project is received via a user interface that is output by the client device. The client device then modifies the creative brief data to reflect this input, such as by modifying default values of intent data and creative spend data. In other words, the client device populates values for the creative brief data to reflect this input. Additionally or alternately, the service provider system or some other computing device generates the creative brief in accordance with the schema.

Based on the creative brief data describing a digital content creation project, the service provider system provides support in connection with the digital content associated with the project. To do so, the service provider system identifies digital content associated with the project, e.g., using a brief identifier that is unique to the digital content creation project and included in data (metadata) of digital content components associated with the digital content creation project. The service provider system can then provide support services during creation of the identified digital content. Example services include surfacing mockup digital content to inspire a content creator, surfacing content scores indicative of how the digital content being created is predicted to perform in relation to a target demographic group, suggesting values (e.g., a demographic segment or an expected performance) for the digital content creation project, and so on. The service provider system surfaces such content by using the creative brief data configured according to the schema. In particular, the creative brief data allows the service provider system to generate predictions regarding how digital content associated with the described digital content creation project will perform with audiences.

Configuring creative briefs according to a set of rules defined by a schema, as described herein, enables service provider systems to surface creative brief information throughout various stages of a content creation project. This is effective to carry a purpose expressed in the creative brief through the project until its end. This helps content creators create digital content that aligns with the expressed purpose. Due to the digital content aligning with the expressed purpose, customers of the content creators are more likely to be satisfied with the created digital content. The described techniques also support other advantages. For example, surfacing mockup digital content that is configured based on the data of the described techniques can inspire the content creators. These mockups can also be effective to suggest content characteristics that, if included in the digital content being created, will cause better performance of that digital content with a demographic segment, e.g., to cause conversion of a product or service.

Further, these techniques enable performance of content creators to be tracked. By way of example, the creative brief data enables service provider systems to score a content creator in terms of whether the content creator's created digital content matches an intent of a creative brief, how the content creator's digital content performs in relation to expected performance, how the content creator's digital content performs with the indicated audience, and so forth. Having standardized creative brief data (standardized according to a schema) also enables the data for different content items associated with these creative briefs to be compared. For instance, performance can be compared for different content items having a same attribute, e.g., a same intent, a same subject, and so forth. Standardized creative brief data also enables advertising optimization (e.g., based on attributes described by a schema-based creative brief), and generation of future creative briefs. Indeed, the described techniques provide a variety of advantages over conventional techniques, which fail to standardize creative briefs so that their information can be repeatedly processed in a known way to provide expected functionality.

Term Descriptions

In the following discussion, a "creative brief" generally refers to digital content that includes data configured according to a creative brief schema.

A creative brief "schema" refers to a set of rules for controlling data specified in creative briefs to describe digital content creation projects. In particular, the creative brief schema controls the information of digital content creation projects that is to be instantiated to provide services for supporting content creation in association with the digital content creation projects.

A "digital content creation project" generally refers to an undertaking involving the creation of digital content components. An example of a digital content creation project is a digital marketing campaign, though other examples may include digital content programs, such as podcasts, streaming video shows, and so on. In accordance with the described techniques, digital content creation projects are registered using a creative brief so that the services described above and below can be provided.

As used herein, "digital content" or a "digital content component" may refer to any of a variety of types of digital content, such as images, web pages, videos, audio clips, sounds, graphics and so forth. Digital content components, in particular, are digital content that is capable of being incorporated into other digital content. For example, an image that is incorporated into a web page can be considered a digital content component.

As used herein, the term "bootstrapping" refers to leveraging historical data and/or data describing digital content that does not correspond to the particular digital content creation project being bootstrapped. By way of example, a digital content creation project that is bootstrapped may leverage data of previous projects associated with the same entity (e.g., past marketing campaigns) and/or data of projects associated with other entities (e.g., different companies).

In the following discussion, an example using the techniques described herein and example environment that may employ such techniques are first described. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to leverage creative brief-based content creation described herein. The illustrated environment 100 includes service provider system 102, client device 104, creative service system 106, marketing analytics system 108, and brief fulfillment source 110 that are communicatively coupled, one to another, via a network 112.

Computing devices that are usable to implement the service provider system 102, client device 104, creative service system 106, marketing analytics system 108, and brief fulfillment source 110 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 9.

The service provider system 102 is illustrated as including a service manager module 114 that is representative of functionality to provide services accessible via the network 112. These services are usable to make products or services available to consumers. The service manager module 114, for instance, may expose a website or other functionality that is accessible via the network 112 by a communication module 116 of the client device 104. The communication module 116 may be configured in a variety of ways, e.g., it may be configured as a browser-based application, a network-enabled application, portions of these configurations (e.g., a plugin or module thereof), and so on that obtains data from the service provider system 102 via the network 112. This data can be employed by the communication module 116 to enable a user of the client device 104 to perform a variety of actions in connection with the service provider system 102, such as to download computing applications when the service provider system 102 corresponds to an application marketplace.

Content editing application 118 is an example application that can be obtained from an application marketplace or directly from a service provider that is associated with the application, e.g., via a website of the creative service system 106. In general, the content editing application 118 represents functionality to modify digital content. In the illustration, the content editing application 118 may correspond to one or more applications capable of modifying a variety of digital content types, such as images, videos, audio, vector graphics, text, and so forth. For example, the content editing application 118 may be a single application or a suite of different applications for modifying digital content.

To leverage creative brief schemas, the creative service system 106 and the client device 104 communicate a variety of information in connection with content creation projects. Creative brief 120 and brief-based content 122 are examples of this information. The creative brief 120 is digital content configured as discussed above and below to convey information about a marketing campaign or some other project involving creation of digital content. A user of the device 104 interacts with the content editing application 118 via a displayed user interface, for instance, to provide information about the marketing campaign or other content-creation project. The creative brief 120 is then generated to include the information received via the user interface. As illustrated, the client device 104 communicates the creative brief 120 to the creative service system 106, which includes functionality to process the creative brief 120's data to identify the project information and generate the brief-based content 122.

The brief-based content 122 represents a variety of content that can be utilized at different points in the content creation process to improve an effectiveness of created content, e.g., to cause conversion of a product or service. Examples of the brief-based content 122 include mock content (e.g., a mock advertisement intended to stimulate a content creator's creativity), a content score indicative of a predicted effectiveness of content being created via the content editing application 118, updates to the creative brief 120, and so forth. The client device 104 is configured to surface the brief-based content 122 in a variety of ways. For example, the client device 104 may display a graphical user interface of the content editing application 118 that includes mock content and/or a content score. Alternately or in addition, the client device 104 presents an interface (e.g., web page) that outputs the information and updated information of the creative brief 120.

To process the creative brief 120 and generate the brief-based content 122, the service provider system 102 may employ the creative service system 106. Although functionality of the creative service system 106 is illustrated as separate from the service provider system 102, this functionality may also be incorporated as part of the service provider system 102, further divided among other entities, and so forth. The creative service system 106 includes a creative brief manager module 124. The creative brief manager module 124 is implemented at least partially in hardware of a computing device to generate the brief-based content 122 based on the creative brief 120. In implementations, the creative brief manager module 124 generates at least some of the brief-based content 122 to include and/or based on digital content 126, which is illustrated as stored in storage 128. For instance, the creative brief manager module 124 represents functionality to generate mockups 130 (e.g., mock advertisements) that incorporate digital content components from the stock 132 (e.g., images, graphics, and so on).

The maintained digital content 126—the mockups 130 and stock 132—may assume a variety of forms, such as images, videos, audio, and so forth. By way of example, one of the mockups 130 can be configured as a digital image for incorporation into a web page as a banner advertisement, e.g., to cause conversion of client device users to purchase a corresponding product or service. The example mockup can be configured to incorporate components (e.g., a background image) from the stock 132. The creative brief manager module 124 is also configured to generate other types of mockups 130, such as an audio message that incorporates components (e.g., background music) from the stock 132. Accordingly, the mockups 130 represent a variety of digital content types without departing from the spirit or scope of the techniques described herein. In at least some implementations, the digital content 126 includes information in addition to the mockups 130 and the stock 132 components. Examples of this additional information include data indicative of content scores, suggested target-demographic information, historical creative briefs and associated digital content, historical conversion information, and so forth. The digital content 126 may represent a variety of information that enables the creative service system 106 to generate and provide the brief-based content 122.

The illustrated example also includes marketing data 134, which describes interactions of client device users with digital content via respective computing devices. The marketing data 134 is generated based on the provision of digital marketing content (e.g., a digital advertisement created using the content editing application 118 by a user of the client device 104) to describe which users received which items of digital marketing campaign (e.g., from particular marketing campaigns), characteristics of the users, and how the users interacted with the delivered items of the digital marketing content. Marketing manager module 136 represents functionality to monitor client device user interactions with such digital marketing content. The marketing manager module 136 also represents functionality to collect information about these interactions and generate the marketing data 134. The marketing data 134 is configured to describe a variety of attributes of user interactions with digital content without departing from the spirit or scope of the described techniques.

The creative brief manager module 124 is further configured to leverage the marketing data 134 in connection with generating the brief-based content 122. For example, the creative brief manager module 124 is configured to generate the mockups 130 based on the marketing data 134 and deliver the generated mockups 130 as the brief-based content 122. In so doing, the creative brief manager module 124 determines characteristics of effective content (e.g., causes conversion) for different demographic segments. In one or more implementations, the creative brief manager module 124 trains a neural network using conversion information associated with different demographic segments (as described in the marketing data 134) along with the corresponding digital marketing content. In this way, the creative brief manager module 124 learns characteristics of digital marketing content that causes conversion with different demographic segments.

Although neural networks are discussed, other machine learning techniques may be used to learn conversion-causing characteristics of digital content in accordance with the described techniques. In one or more implementations, the conversion-causing characteristics are learned to produce a machine-learning model, e.g., to provide services in connection with content creation. As used herein, a "machine-learning model" may refer to a computer representation that can be tuned (e.g., trained) based on inputs to approximate unknown functions. For instance, a machine-learning model can include a model that utilizes algorithms to learn from, and make predictions on, known data by analyzing the known data to learn to generate outputs that reflect patterns and attributes of the known data. By way of example, a machine-learning model can include but is not limited to, decision trees, support vector machines, linear regression, logistic regression, Bayesian networks, random forest learning, dimensionality reduction algorithms, boosting algorithms, neural networks, deep learning, support vector machines (SVMs), etc. Thus, a machine-learning model makes high-level abstractions in data by generating data-driven predictions or decisions from the known input data.

Regardless of how the characteristics are learned, the learned characteristics enable the creative brief manager module 124 to configure a mockup 130 to include content with characteristics for targeting a particular demographic segment, such as a segment specified in the creative brief 120. Alternately or in addition, the creative brief manager module 124 uses the learned characteristics to predict conversions of different demographic segments in relation to a created content item or in relation to information described in a creative brief, e.g., associated product or service, intent, aesthetic and brand image, and so forth. Such predictions serve as bases for computing content scores and generating demographic-group suggestions for marketing campaigns.

The illustrated environment 100 also includes socially fulfilled digital content 138, which is shown provided by the brief fulfillment sources 110. In general, a brief fulfillment source 110 is associated with a device user that creates digital content in connection with a creative brief In one or more implementations, an entity (e.g., a marketer) selects to post a creative brief for electronic dissemination among the brief fulfillment sources 110, e.g., via a social networking service associated with content creation (e.g., Adobe® Behance). A device user of a brief fulfillment source 110 can select to fulfill the posted creative brief, e.g., by interacting with content creation tools (e.g., applications) to create digital content indicated by the creative brief Once the content is created, the device user can select to provide the created content to the entity (e.g., the marketer) as the socially fulfilled digital content 138. Accordingly, the corresponding brief fulfillment source 110 communicates the socially fulfilled digital content 138 to the creative service system 106, which can provide the socially fulfilled digital content 138 to the requesting entity. Alternately or in addition, the corresponding brief fulfillment source 110 communicates the socially fulfilled digital content 138 to the requesting entity. In some implementations, the creative brief manager module 124 scores the socially fulfilled digital content 138, such that a score indicates how well the socially fulfilled digital content 138 fulfills the posted creative brief. This score may indicate a predicted performance of the content in relation to a targeted demographic segment associated with the creative brief In any case, configuring creative briefs as described herein enables content creation projects (or portions thereof) to be easily presented to a multitude of freelancing content creators and fulfilled by them.

Having considered an example environment, consider now a discussion of some example details of the techniques for creative brief-based content creation in a digital medium environment in accordance with one or more implementations.

Creative Brief-Based Content Creation

Figure 2:
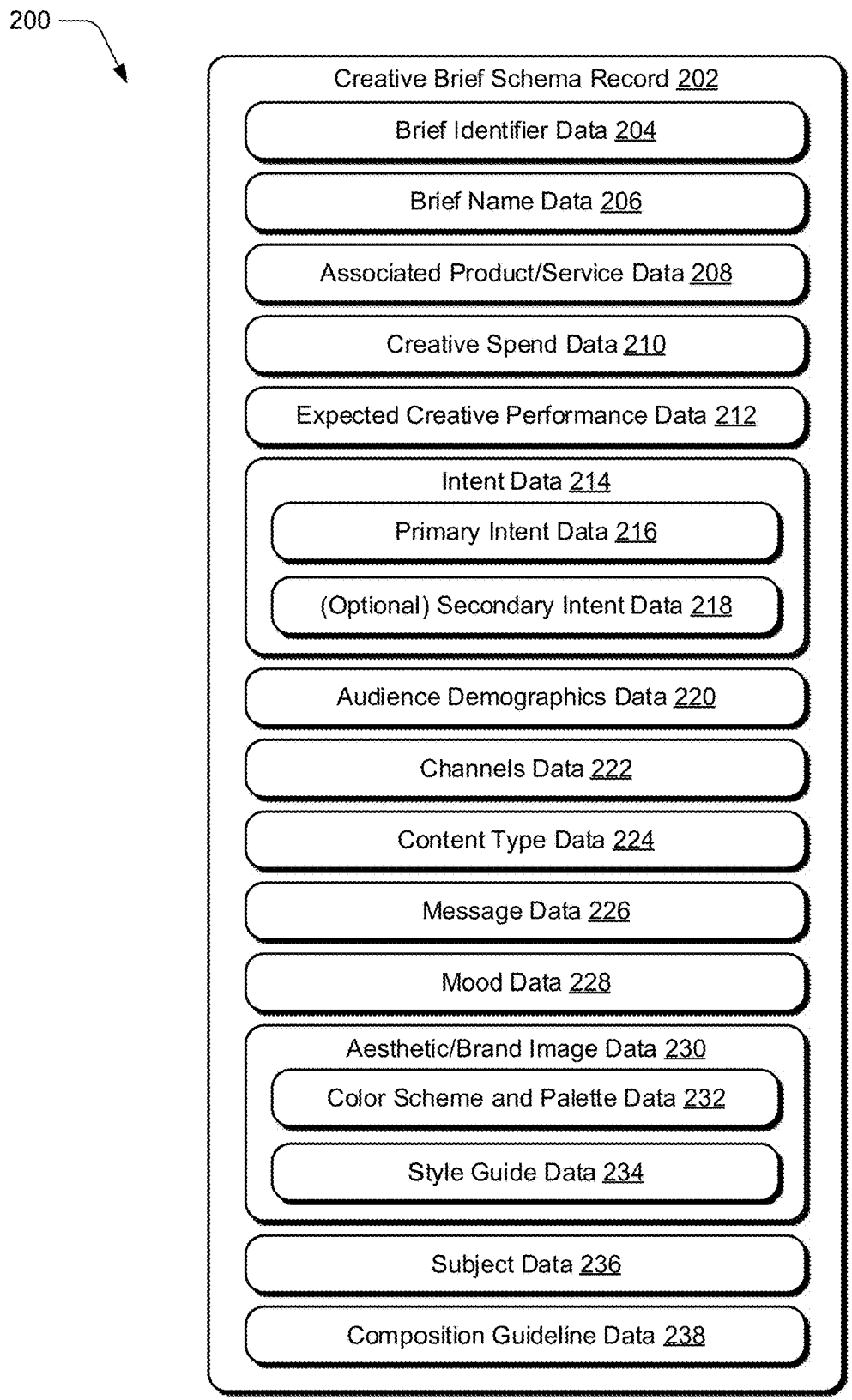
FIG. 2 depicts an example depicting a data structure that is usable to implement a schema for surfacing creative brief information throughout the content creation process.

FIG. 2 depicts an example implementation 200 of a data structure that is usable to implement a schema for controlling a format of creative briefs and for surfacing creative brief information throughout the content creation process. This schema is also be used as a basis for generating analytics in relation to schema-based creative briefs (such as to compare content created in association with briefs having a same intent), as a basis for prepopulating attributes of schema-based creative briefs given a selection of one or more project attributes (e.g., prepopulating a creative brief based on a user-selected intent for the brief), and so forth.

In particular, the example 200 includes creative brief schema record 202, which is depicted with various data according to a set of rules defined by the schema to describe example attributes associated with content creation. It should be appreciated that the creative brief schema record 202 may be configured with different combinations of data corresponding to different attributes than illustrated without departing from the spirit or scope of the techniques described herein.

Broadly speaking, the data of the creative brief schema record 202 enables information associated with the creative brief to be surfaced throughout the content creation process in a standardized way, e.g., in different content creation applications and across different creative projects. Additionally, regardless of the particular attributes of the schema, creating creative briefs according to a schema results in these briefs having a standardized format—a format controlled by the schema. This enables the briefs and the content created in connection with them to be compared and utilized for content creation tools, such as to prepopulate one or more attributes of future creative briefs, configure tools of content editing applications, and so forth. In other words, the data of the creative brief schema record 202 enables the creative brief manager module 124 to process creative briefs in a repeatable manner so that expected services (e.g., provision of creative mockups, content-creation scores, demographic suggestions, automatically populated application tools, and so on) can be provided.

In this context, consider the example data of the illustrated creative brief schema record 202. The creative brief schema record 202 is depicted including brief identifier data 204, brief name data 206, associated product/service data 208, creative spend data 210, expected creative performance data 212, intent data 214 which is illustrated having primary intent data 216 and (optional) secondary intent data 218, audience demographics data 220, channels data 222, content type data 224, message data 226, mood data 228, and aesthetic/brand image data 230 which is illustrated having color scheme and palette data 232 and style guide data 234, subject data 236, and composition guideline data 238.

The creative brief schema record 202 is generated in connection with delivery of the creative brief 120 to the creative service system 106. In one or more implementations, the client device 104 leverages functionality of the content editing application 118 to generate the creative brief 120 according to the creative brief schema record 202. In other words, the communicated creative brief 120 comprises data configured according to the creative brief schema. Alternately or in addition, the creative brief manager module 124 generates the creative brief schema record 202 based on the information contained in the creative brief 120. In any case, a creative brief schema record 202 may be generated in connection with each creative brief 120 (typically one such brief per creative project) and maintained by the creative brief manager module 124 to provide the various digital content indicated above and below. Instantiation of the creative brief schema record 202 is further effective to register the corresponding creative content project with the creative service system 106.

The brief identifier data 204 identifies the creative project corresponding to the creative brief schema record 202. For instance, the brief identifier data 204 may correspond to a random global unique identifier (GUID) associated with the creative project or some other mechanism to uniquely distinguish the creative project (and information associated therewith) from other creative projects and information. By way of example, the brief identifier data 204 ties the mockups 130 to the creative project so that when a user works on a component of the creative project (e.g., via the content editing application 118) the mockup 130 can be surfaced in a context in which the user is working, e.g., a portion of the content editing application 118's interface.

The brief name data 206 identifies a name of the creative brief, which may correspond to a name of the creative project, e.g., 'Fall 2017 At-Home Program Marketing Campaign'. In one or more implementations, the brief name data 206 corresponds to a text string. In general, the brief name data 206 may correspond to an identifier that is human-recognizable so that when the indicated name is surfaced (e.g., as part of a user interface), human users of client devices can more easily recognize the creative projects with which they are interacting. In one or more implementations, the brief name data 206 corresponds to user input, e.g., received via a text field, extracted from a digital creative brief document, and so on.

The associated product/service data 208 identifies a product or service with which the creative project is associated. The associated product/service data 208 may be configured in a variety of formats to identify the product or service with which the creative project is associated. In one or more implementations, the associated product/service data 208 is configured as a text string indicative of the product or service. Alternately or in addition, the creative brief manager module 124 maintains or has access to digital records for a variety of products or services, such that each record includes a unique identifier to uniquely identify the product or service of the respective record. In such scenarios, the associated product/service data 208 can be configured as the unique identifier associated with the product or service. In one or more implementations, the associated product/service data 208 corresponds to user input, e.g., received via a text field, extracted from a digital creative brief document, received via some other user interface instrumentality such as a drop down menu, and so forth.

The creative spend data 210 generally describes a cost specified for creation of digital content for the corresponding content project. By way of example, the creative spend data 210 may describe a target amount of money an entity is willing to spend with a third-party advertising agency or in-house advertising department. By "target amount," it is meant that the actual amount of money exchanged may vary depending on different factors, such as scope of work, difficulty of work, availability of resources, and so forth. The creative spend data 210 can also describe a fixed amount of money the entity will pay. The creative spend data 210 is also configured to describe monetary elements for other aspects associated with a content project, such as an amount of money for delivering the content. In accordance with the described techniques, the creative spend data 210 corresponds to user input that associates one or more monetary amounts with one or more stages of a content creation project.

The expected creative performance data 212 describes an expected performance of the digital content created in connection with the corresponding content project. The expected creative performance data 212 is configured to describe performance in a variety of ways. For example, the expected creative performance data 212 can describe performance in terms of conversion, e.g., a measured ability of a digital content item of the content creation project to generate a desired action over a number of device users. The expected creative performance data 212 can also describe performance in terms of revenue, e.g., the amount of money received as a result of selling the associated products or service while digital content items of the content creation project are being served to device users.

The intent data 214 generally describes an intent that an entity has for undertaking the content creation project. As noted above, the illustrated intent data 214 also includes the primary intent data 216 and the (optional) secondary intent data 218. These represent that there can be more than one intended purpose for a content creation project. The primary intent data 216 and (optional) secondary intent data 218 also indicate that some intended purposes have higher priority (e.g., primary) than others (e.g., secondary). By way of example, the intent data 214 can indicate for a particular campaign that a primary intent is to 'sell a maximum number of a product' (as indicated by the primary intent data 216) and that a secondary intent is to 'increase brand awareness among one or more demographic segments' (as indicated by the (optional) secondary intent data 218). As indicated, the secondary intent data 218 is optional and thus may not be included in some scenarios. The intent data 214 can be configured to include data indicative of more or fewer intended purposes of a content project without departing from the spirit or scope of the described techniques.

The audience demographics data 220 describes demographics of an audience of device users to which digital content of a content project is delivered. In one or more implementations, the audience demographics data 220 describes the demographics of users to which the digital content is intended to be delivered, e.g., a marketing segment. In such implementations, the audience demographics data 220 may be based on user input indicating demographics of the users. Alternately or in addition, the audience demographics data 220 is generated based on other data of the creative brief schema record 202, such as the associated product/service data 208, the intent data 214, the mood data 228, and so on. In such scenarios, the audience demographics data 220 indicates a demographic segment that the creative brief manager module 124 predicts will have a highest conversion rate based on the other data. The audience demographics data 220 is configured to describe a variety of demographics about users, including age, gender, location, interests, education level, income level, devices with which the user is associated, products the user has purchased and/or considered for purchase, services the user has purchased and/or considered for purchase, posts the user has posted to any of a variety of social networking services, and so on.

The channels data 222 describes channels for delivering the digital content of the corresponding content project. Information regarding delivery channels can be useful to content creators because the types of channels can influence the content created, e.g., colors used, size of content, aspect ratio of content, fonts used, and so forth. Example of channels include different social networking services, websites (and specific web pages), email messages, streaming video, streaming music, television, radio, newspapers, and so on. Accordingly, the channels data 222 is indicative of channels selected (e.g., by user input or by the creative brief manager module 124 based on the other data of the creative brief schema record 202) for the digital content of the content project. The channels data 222 is further configured to describe multiple selected channels for a content project, such as to describe delivering two different digital content items of a given project using different channels.

The content type data 224 describes the types of digital content to create in connection with the content project. Examples of content types include images, videos, audio, text, vector graphics, and so on. In one or more implementations, the content type data 224 further describes a format of the digital content to create. With reference to video, for instance, the content type data 224 can describe to create a video having one of a plurality of formats, including motion picture expert group (MPEG) video file format, H.264 video format, MOV file format, and so on. The content type data 224 is also usable to specify further format aspects of the digital content created in connection with the content project, such as a size or dimensions of visual digital content (e.g., height and width in pixels), duration of video or audio, and so forth.

The message data 226 describes a message that is to be conveyed by the digital content created in connection with the content project. In one or more implementations, the message data 226 indicates text to include in visual digital content, such as in images and videos. For digital content having audio, though, the message data 226 can indicate an audio message to include, such as a message that is to be spoken. In addition or alternately, the message data 226 is configured to indicate a message that a content creator is to configure the digital content to convey, e.g., using visual imagery in visual digital content, audio imagery in digital content having audio, and so on.

The mood data 228 describes a mood associated with the content creation project. Examples of moods include happy, scaly, exciting, pleasant, subdued, romantic, funny, lighthearted, and so forth. Accordingly, the mood data 228 is configured to indicate moods selected (e.g., by user input or by the creative brief manager module 124 based on the other data of the creative brief schema record 202) for the content creation project The mood data 228 is further configured to describe multiple selected moods for a content project, such as to describe multiple moods for a single digital content item of a given project, respective moods for two different digital content items of a given project, and so on.

The aesthetic/brand image data 230 describes aesthetics of digital content associated with an entity and/or branding of the entity. Examples of aesthetics include tones, saturation, brightness, colors, artistic styles, and so on of visual digital content associated with the entity, such as digital content used in connection with historical marketing campaigns of the entity. Branding includes a variety of aspects associated with information a company presents in connection with selling products and services. For instance, an entity's brand can include logos, fonts, a color palette, messages, digital content layouts, and so on. Accordingly, the aesthetic/brand image data 230 is configured to indicate such aesthetics and/or branding associated with an entity. Aesthetic and brand information may be maintained by the creative service system 106, e.g., in association with an entity's previous content creation projects available to the creative service system 106. Accordingly, the creative brief manager module 124 may instantiate the aesthetic/brand image data 230 based on the information maintained about previous content creation projects.

As illustrated, the aesthetic/brand image data 230 includes color scheme and palette data 232 and also includes style guide data 234. The aesthetic/brand image data 230 may include or represent other types of data without departing from the spirit or scope of the techniques described herein, such as font data (e.g., font families, sizes, and other font characteristics). In general, the color scheme and palette data 232 is configured to describe one or more colors and/or combinations of colors that are to be used in connection with content being created. In addition to mere colors, the color scheme and palette data 232 may be used to describe shape fills used in connection with the content being created, such as gradient and pattern fills. The color scheme and palette data 232 may also describe colors of shape lines for the content being created. Indeed, the color scheme and palette data 232 may be used to describe various attributes related to colors allowed in content created in connection with the creative brief schema record 202.

The style guide data 234 is configured to describe criteria for styling content created in connection with the creative brief schema record 202. By way of example, the style guide data 234 may describe styles of lines that can to be used for the content being created, e.g., a line weight, line type (e.g., dashed, solid, etc.), line end (e.g., rounded, mitered, etc.), and so on. Indeed, the style guide data 234 may be used to describe various attributes related to styles of the content created in connection with the creative brief schema record 202 without departing from the spirit or scope of the described techniques.

The creative brief schema record 202 further includes subject data 236. The subject data 236 is configured to describe a subject that is to be conveyed (e.g., depicted in images, audibly conveyed in audio, and so on) with the content created in association with the creative brief schema record 202. In one or more implementations, the subject data 236 may be configured as tags that define a subject for the digital content to be created. Regardless of how configured, the subject data 236 is usable to describe criteria for the content that is to be created in a prescriptive manner. For instance, the subject data 236 is usable to indicate that an image to be created in connection with the creative brief schema record 202 is to depict a man's face, and that this face is to face right and occupy a left 28% of the image.

Though the subject data 236 describes these granular criteria for the content, there remains room for a content creator to still be creative. Given the criteria described by the example subject data 236, for instance, the content creator can still select or generate images having varying attributes, such as by varying the man's ethnicity, hairstyle, facial hair, and so forth. The subject data 236 may further be used to describe activities of subjects conveyed in the digital content being created, such as to specify that a subject of the content is to be talking on a phone, swimming, laughing with other subjects in the content, driving an automobile, and so forth. The subject data 236 can be used to describe other attributes of subjects in the content without departing from the spirit or scope of the described techniques.

In the illustrated example 200, the creative brief schema record 202 further includes composition guideline data 238. In general, the composition guideline data 238 describes criteria for controlling aspects related to a layout of content created in connection with the creative brief schema record 202. By way of example, the composition guideline data 234 may describe criteria such as locations of photographic imagery relative to computer-generated graphics, locations of computer-generated graphics, locations of text, amounts of "white space" in the content, an amount of content that is allowed to correspond to photographic imagery (in contrast to computer-generated graphics), constraints for the photographic imagery, constraints for the computer-generated graphics, and so forth. The composition guideline data 234 may be used to describe different attributes for one or more layouts of the content being created without departing from the spirit or scope of the described techniques.

With regard generally to the data of the creative brief schema record 202, the described systems are capable of incorporating data indicative of at least some of the attributes into the content being created. By way of example, the content editing application 118 may modify a file of an image created in connection with the creative brief schema record 202 to include the brief identifier data 204 in metadata of the image. The other attributes described by the creative brief schema record 202 may be received (e.g., from the creative service system) by using the brief identifier data 204 as a reference. In addition or alternately, content items created in connection with the creative brief schema record 202 may simply include data indicative of the entire record—the entire record may be incorporated into these content items. The creative brief schema record 202 may be formed using extensible markup language (XML), such that the XML can be embedded into the content items created in connection with the record. This creative brief schema record 202 thus enables at least some of the indicated attributes to be exposed throughout the creative process. For example, the color scheme and palette data 232 can be exposed, at least in part, as selectable items surfaced in a panel of a user interface, e.g., a color swatch that is selectable to impose a color on content items being created, a font indication that is selectable to impose a font family and size on text in the content items being created, and so on.

The data of the creative brief schema record 202 can also be incorporated into analytics. By way of example, the marketing analytics system 108 can generate analytics describing conversion (or other metrics) of a content item created in connection with the creative brief schema record 202. Collectively, the marketing analytics system 108 uses this information to generate aggregated analytics for data of multiple creative briefs configured according to the creative brief schema record 202.

By way of example, the marketing analytics system 108 can determine a conversion for each item of content having a same intent, as indicated by the intent data 214. Based on this, the marketing analytics system 108 can generate digital content for presentation that conveys information regarding how well content having different intents performs, according to the determined conversion. The marketing analytics system 108 can configure the digital content to present this information with varying degrees of granularity. Referring again to the intent example, the marketing analytics system 108 can configure the digital content to present information indicative of conversion across all users of a plurality of content items having a same intent. Alternately or in addition, the marketing analytics system 108 can configure the digital content to present information indicative of conversion of the plurality of content items in relation to different segments of users, e.g., a first conversion of the content items in relation to a first segment of users, a second conversion of the content items in relation to a second segment of users, and so forth.

Consider another example of using schema-based creative briefs to provide analytics. In this example, the subject data 234 can be used to describe a direction in which a person's face that is depicted in created content is facing. In particular, the subject data 234 for creative brief schema records 202 of a multitude of content items can indicate the content items that depict a person's face facing left and the content items that depict a person's face facing right. The marketing analytics module 108 can thus determine conversion of content items in which a person's face is facing to the left and conversion of content items in which a person's face is facing to the right. The marketing analytics module 108 can then compare the determined conversions to determine whether content having right-facing faces or left-facing faces converts at a higher rate. The marketing analytics module 108 can also generate digital content indicative of this information, such as indicative of the conversion rate of content with left-facing faces, the conversion rate of content with right-facing faces, whether content having left-facing or right-facing faces causes higher conversion, and so forth. Moreover, future schema-based creative briefs can be pre-populated with subject data 234 based on these analytics, such as to specify that a person's face in the content that is to be created is to face the direction having higher historical conversion.

In one or more implementations, the various data used to form an instance of the creative brief schema record 202 is based, at least in part, on user input to specify values for the data. Alternately or in addition, the various data values are extracted from an electronic document, e.g., a word processing document. Further still, values for the various data of the creative brief schema record 202 can be determined by the creative brief manager module 124. The creative brief manager module 124 is configured to make such determinations based on data of the creative brief schema record 202 that is already known as well as other data, e.g., the marketing data 134. The various data can also be populated through a combination of user input, extraction from documents, and determinations made by the creative brief manager module 124.

Consider an example in which the brief name data 206, the associated product/service data 208, the creative spend data 210, the intent data 214, the mood data 228, and the aesthetic/brand image data 230 are instantiated with data that is based on user inputs (e.g., via a user interface of the content editing application 118) or extracted from an electronic document created by a user to serve as a creative brief. In this example, the creative brief manager module 124 is configured to determine values for the other data of the creative brief schema record 202. By way of example, the creative brief manager module 124 predicts demographic segments based on the already-instantiated data (e.g., the data listed just above) and the marketing data 134. The creative brief manager module 124 is further configured to predict a performance (e.g., conversion) of digital content having attributes corresponding to the already-instantiated data, e.g., having a mood and brand attributes described by the mood data 228 and aesthetic/brand image data 230, respectively. Based on the predicted demographic segments and performance, the creative brief manager module 124 provides values indicative of the predictions to serve as the audience demographics data 220 and the expected creative performance data 212.

The creative brief manager module 124 is configured to instantiate a variety of the creative brief schema record 202's data based on the data that is already populated, historical data about an entity associated with the record or about other content creation projects of other entities, the marketing data, and so on. To do so, the creative brief manager module 124 may leverage one or more machine learning techniques (e.g., neural networks) that enable portions of the data to be predicted given other portions of the data. As discussed above, the creative brief manager module 124 is configured to train these neural networks based on exposure to the marketing data 134, the data of historical creative brief schema records 202, and the respective digital content created in connection with the creative brief schema records 202. Alternately or in addition, the creative brief manager module 124 simply accesses neural networks trained based on such data. In the context of receiving user input that serves as a basis for the data of the creative brief schema record 202, consider FIG. 3.

Figure 3:
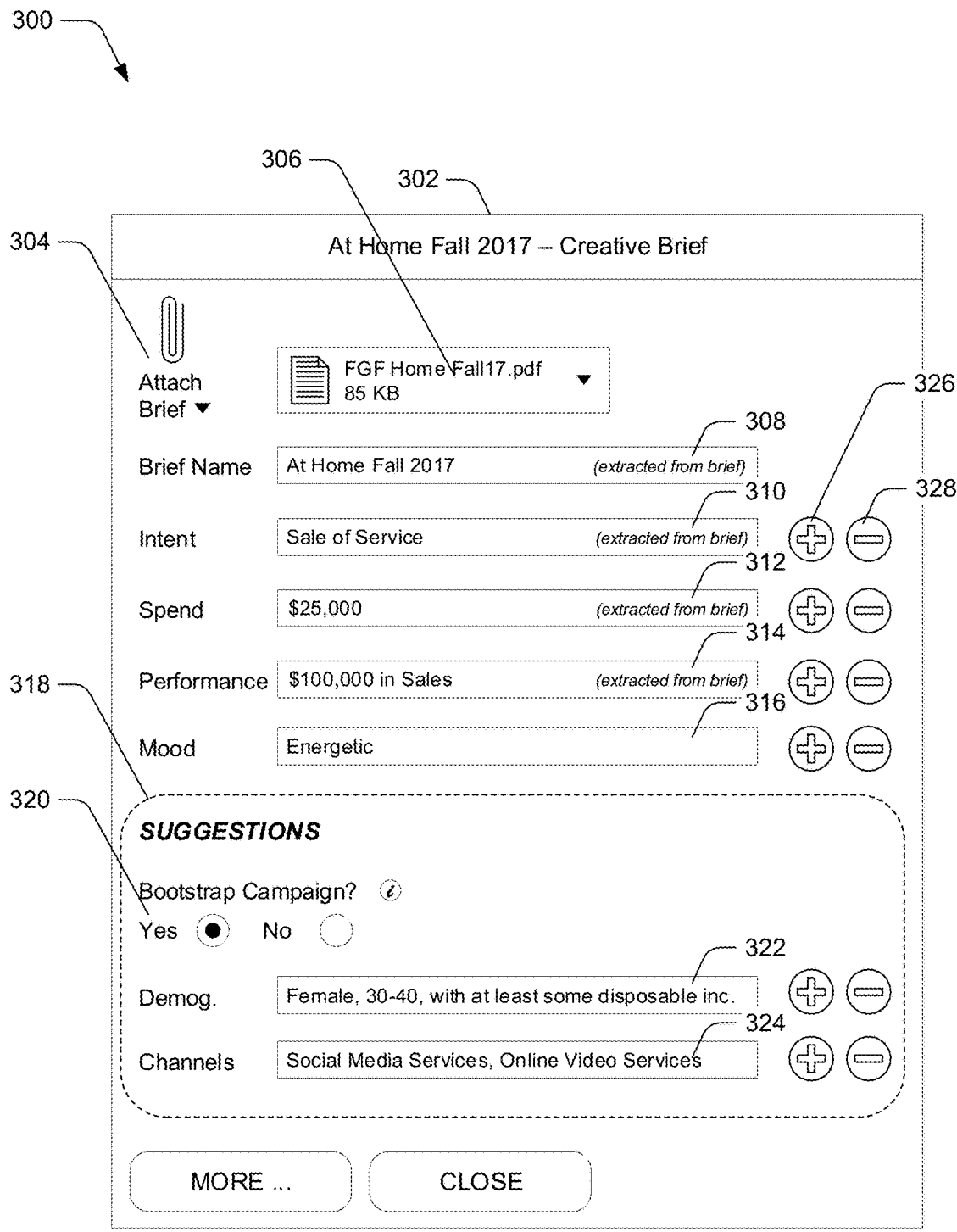
FIG. 3 depicts an example user interface that is configured to receive input for changing and present a variety of creative-brief information in connection with generating a creative brief.

FIG. 3 depicts an example 300 of a user interface that is configured to receive input for changing and present a variety of creative-brief information in connection with generating a creative brief In particular, the example 300 includes brief interface 302.

The brief interface 302 represents functionality to receive input at the client device 104 from a device user. In the illustrated example 300, the brief interface 302 is depicted having a particular combination of instrumentalities and configured for visual-based presentation and interaction, e.g., via interactions with a display device and a mouse, keyboard, touch input, or the like. Nonetheless, the brief interface 302 can be configured in different ways to enable a user of the client device 104 to provide input for instantiating the creative brief schema record 202. For instance, the brief interface 302 may be audio based, such that information about the brief and prompts are output via a voice-controlled speaker. Such a speaker is also capable of receiving and processing voice input to instantiate the data.

In any case, the illustrated brief interface 302 includes file attachment instrumentality 304, file attachment indication 306, brief name instrumentality 308, project intent instrumentality 310, project spend instrumentality 312, expected performance instrumentality 314, mood instrumentality 316, and a suggestions portion 318. The suggestions portion 318 is depicted having bootstrap instrumentality 320, demographics instrumentality 322, and channels instrumentality 324. The instrumentalities listed just above are configured to present information, as depicted in the example 300. These instrumentalities are also configured to receive user input to adjust the presented values and thus modify the corresponding data of the creative brief schema record 202.

The file attachment instrumentality 304 represents functionality to identify a document, such as a document to serve as a basis for a creative brief. The file attachment instrumentality 304 enables a variety of file types to be identified, including word processing documents, digital images (e.g., depicting paper with handwritten notes), portable document format (PDF) files, presentation files, and so forth. The file attachment indication 306 indicates documents that have been identified using the file attachment instrumentality 304. Documents indicated by the file attachment indication 306 serve as a basis for a creative brief insofar as these documents are processed to extract information corresponding to the various data of the creative brief schema record 202. An instance of the creative brief schema record 202 can be instantiated using the extracted information, e.g., the creative brief manager module 124 modifies default data (e.g., null) of the creative brief schema record 202 to indicate respective extracted data.

Consider an example in which a document identified by the file attachment indication 306 includes text saying 'The budget for the FGF Fall 2017 At Home Program is $25,000.' The creative brief manager module 124 is configured to process the identified document, extract the above-noted text, and determine that the text indicates a cost specified for creation of digital content is $25,000, e.g., using natural language processing (NLP) techniques. Based on this, the creative brief manager module 124 modifies a default value for the creative spend data 210 to indicate $25,000. In some scenarios, this information extraction and data modification process may not result in modification of each data field of a creative brief schema record 202. This is because an identified document simply may not include information corresponding to each of the creative brief schema record 202's data fields. Nonetheless, the creative brief manager module 124 is configured to modify the data for which an identified document does include information.

In this context, consider the brief name instrumentality 308. The brief name instrumentality 308 is configured to present a name of a creative project and also to receive input to modify a name of the creative project. The name presented by this instrumentality corresponds to the brief name data 206. Thus, if user input is received via the brief name instrumentality 308 to change the presented name, the creative brief manager module 124 modifies the brief name data 206 accordingly. As indicated in the illustrated example (e.g., by the '(extracted from brief)' indication), the name of a creative project can also be extracted from the document identified by the file attachment indication 306, set as the brief name data 206, and presented.

As the brief name instrumentality 308 corresponds to the brief name data 206, the project intent instrumentality 310 corresponds to the intent data 214, the project spend instrumentality 312 corresponds to the creative spend data 210, the expected performance instrumentality 314 corresponds to the expected creative performance data 212, and the mood instrumentality 316 corresponds to mood data 228. In contrast to these other instrumentalities, the illustrated mood instrumentality 316 does not include an '(extracted from brief)' indication. This indicates that in the example 300, the presented mood does not correspond to information extracted from the identified document. Instead, the example 300 illustrates a scenario in which the presented mood information (e.g., 'Energetic') is based on user input, such as typing via a keyboard while focus is on the mood instrumentality 316. Though those other instrumentalities correspond to extracted information, it should be appreciated that user input may be received in relation to them to modify the respective data.

As noted above, the creative brief manager module 124 is also capable of generating digital content as suggestions for a creative project, such as to suggest a demographic segment to which to target the digital content. As also noted above, the creative brief manager module 124 makes these suggestions based on predictions determined using machine learning, such as a prediction that a suggested demographic segment will have a highest conversion among all demographic segments. These predictions are based on already-populated data of the respective creative brief schema record 202 and other information as described above. In this context, consider the suggestions portion 318.

The suggestions portion 318 presents suggestions generated by the creative brief manager module 124. The illustrated suggestions suggest that the creative project be bootstrapped to historical projects, a demographic segment to which to target digital content of the creative project, and channels via which to deliver the digital content of the creative project. It should be appreciated that these suggestions are merely example suggestions and that other information, such as information corresponding to the brief name instrumentality 308, the project intent instrumentality 310, the project spend instrumentality 312, the expected performance instrumentality 314, and the mood instrumentality 316 can also be suggested in one or more usage scenarios.

Though the suggestions portion 318 indicates a suggestion to bootstrap the creative project, user input may nevertheless be received via the bootstrap instrumentality 320 indicating not to bootstrap the creative project, e.g., via the 'No' radio button. This causes the creative project corresponding to the brief interface 302 not to be bootstrapped. In one or more implementations, a "bootstrapped" creative project leverages data of historical projects in connection with suggesting data for the creative brief schema record 202. In particular, the creative brief manager module 124 leverages the data of historical projects, e.g., the marketing data 134, the creative brief schema record 202 data, and digital content created in connection with those projects. The creative brief manager module 124 leverages this data as a basis for making the above-discussed predictions for the current project. By way of example, if the creative project corresponding to the brief interface 302 relates to at-home workout programs, the creative brief manager module 124 leverages data associated with other at-home workout programs. Bootstrapping is advantageous for entities that do not have historical data regarding their creative projects. This is because it enables entities to be presented information they may not yet know or are not able to determine, e.g., due to a lack of historical data. An example of an entity that may bootstrap is a new, small business that does not have much, if any, experience in the market, but that nevertheless launches a content creation project, e.g., to advertise a product or service.

The demographics instrumentality 322 and the channels instrumentality 324 are configured in a similar manner as the other above-discussed instrumentalities. In particular, the demographics and channels instrumentalities 322, 324 correspond to the audience demographics data 220 and the channels data 222, respectively. These instrumentalities are also configured to present indications of the corresponding data and to receive input to modify corresponding data. For example, a user may provide typed input via a keyboard to add a channel via the channels instrumentality 324.

The illustrated brief interface 302 is depicted as a displayable dialog box with particular instrumentalities though other configurations for presenting data and receiving input (e.g., different instrumentalities) in relation to a creative brief schema record 202 are contemplated within the spirit and scope of the techniques described herein. The brief interface 302 may be updated as user input is received via instrumentalities, for instance. By way of example, the suggestions can be updated when user input is received via a presented instrumentality to change the presented information. In accordance with the illustrated example, a user may select an add icon 326 to add an instrumentality (e.g., select the add icon 326 proximate the project intent instrumentality 310 to add another intent instrumentality) or remove a presented instrumentality by selecting a corresponding minus icon 328. Inputs received via the brief interface 302 are usable to generate the creative brief 120 as a creative brief schema record 202. In this context, consider FIG. 4.

In one or more implementations, the brief interface 302 may be configured to allow a user to provide input to specify one or more attributes for a new creative brief and select to search for creative briefs having the specified attributes. The creative brief service system 106 may identify and return schema-based creative briefs having the attributes, and the client device may present these returned creative briefs via the brief interface 302. This allows a user of the client device 104 to review the returned creative briefs and select one of the creative briefs to serve as a basis for the new creative brief Based on a selection to create a new creative brief from one of the returned creative briefs, the client device 104 and/or the creative service system 106 generates a new creative brief record by copying at least some of the information of the selected creative brief to the new creative brief. This further allows already generated creative briefs to serve as templates for new creative briefs.

Figure 4:
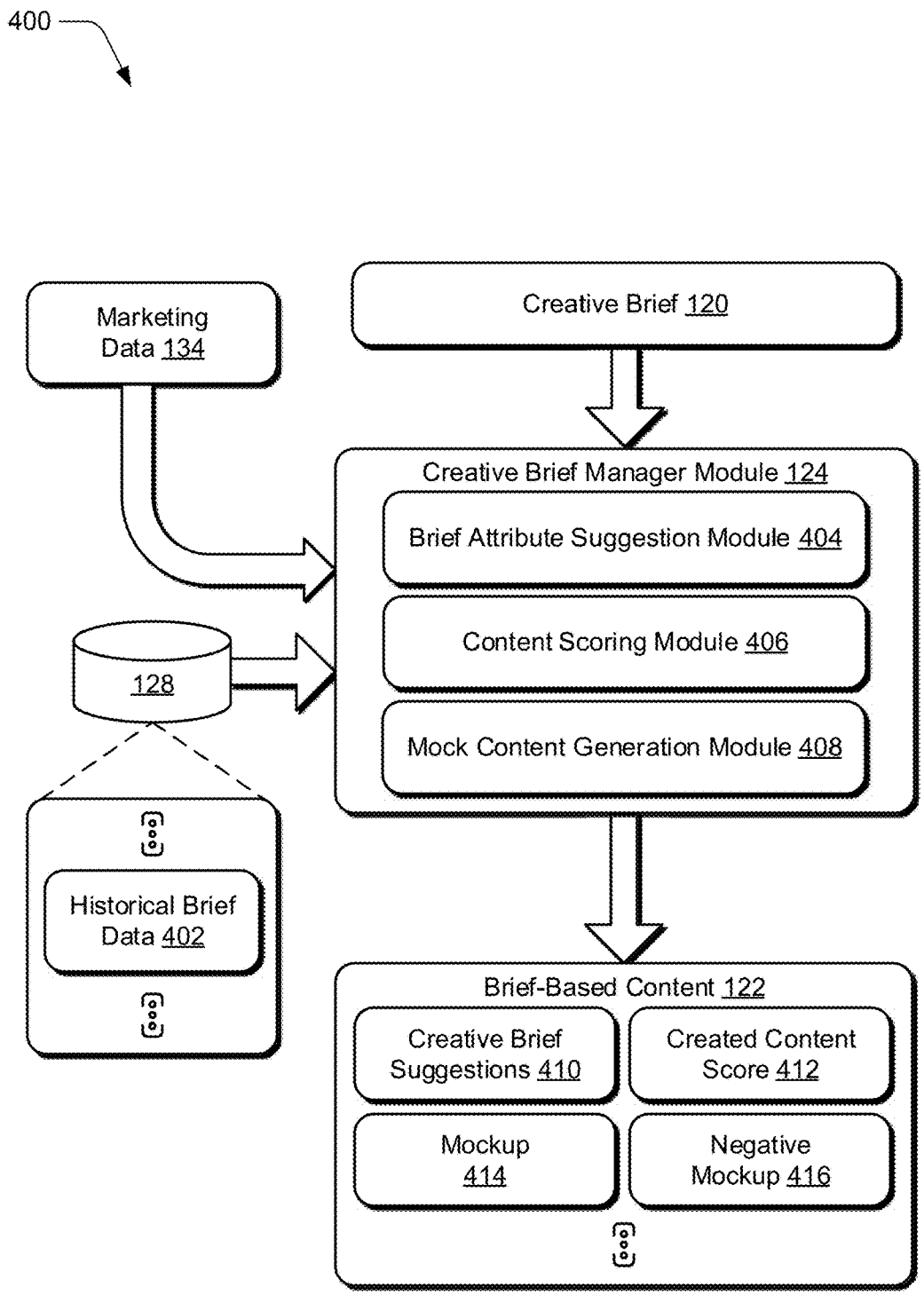
FIG. 4 depicts an example implementation in which a creative service system of FIG. 1 generates different digital content based on the creative brief, marketing data, and/or historical brief data.

FIG. 4 depicts an example implementation 400 in which a creative service system of FIG. 1 generates different digital content based on the creative brief, marketing data, and/or historical brief data. In particular, the example 400 depicts the creative brief manager module 124, which is accessible to the creative service system 106 of FIG. 1.

In the illustrated example 400, the creative brief manager module 124 is depicted receiving the creative brief 120. In accordance with the described techniques, the creative brief 120 is configured in accordance with the creative brief schema record 202. The creative brief manager module 124 is also depicted receiving the marketing data 134 and historical brief data 402, which is illustrated as stored in the storage 128. In general, the historical brief data 402 represents data, such as the creative brief schema records 202, associated with other creative projects. These other creative projects may correspond to an entity with which the illustrated creative brief 120 is associated or other entities. Additionally, the historical brief data 402 may include digital content created in connection with other creative briefs.

The creative brief manager module 124 is illustrated including brief attribute suggestion module 404, content scoring module 406, and mock content generation module 408, which are implemented at least partially in hardware of a computing device to carry out the functionality of the creative brief manager module 124 as described above and below.

The brief attribute suggestion module 404 represents functionality of the creative brief manager module 124 to generate suggestions for the creative brief, such as suggestions corresponding to the various data of the creative brief schema record 202. For instance, the brief attribute suggestion module 404 may suggest a brief name, expected creative performance, channels, a target demographic segment, and so on. In one or more implementations, the generated suggestion data is presented via the suggestions portion 318 of the brief interface 302. To generate such suggestions, the brief attribute suggestion module 404 uses the data of the creative brief schema record 202, the marketing data 134, and the historical brief data 402. Additionally, the brief attribute suggestion module 404 is configured to leverage one or more machine learning techniques (e.g., neural networks) in connection with generating these suggestions.

The content scoring module 406 represents functionality of the creative brief manager module 124 to generate a content score for content items created in association with the creative brief 120. In one or more implementations, the creative brief manager module 124 generates a content score by predicting receptiveness of demographic segments indicated by the audience demographics data 220. In such scenarios, a more favorable content score represents that the indicated demographic segments are predicted to be more receptive to the content being created than less favorable content scores. In one or more implementations, the creative brief manager module 124 generates a content score by predicting an extent to which the content being created will achieve the performance (e.g., conversion) indicated by the expected creative performance data 212. In such scenarios, a more favorable content score represents that the content being created is more likely to meet or exceed the indicated performance than a less favorable content scores. Further, the content scoring module 406 is configured to generate content scores for a digital content item that is being created based on the data of the creative brief schema record 202, the marketing data 134, and the historical brief data 402. The content scoring module 406 may generate content scores for content items being created that are indicative of different qualities than discussed without departing from the spirit or scope of the described techniques.

The mock content generation module 408 represents functionality of the creative brief manager module 124 to generate digital content as a mockup of the digital content that is to be created in connection with the creative brief 120. Mockups generated by the creative brief manager module 124 comprise digital content, such as digital images, videos, audio, and so forth. These mockups are surfaced to a user that is creating content in connection with the creative brief 120. For example, a mockup can be presented via an interface of the content editing application 118 while the application is used to edit a content item. In general, the mockups are configured by the creative brief manager module 124 to have a 'look and feel' or 'sound and feel' determined for the creative project. The creative brief manager module 124 determines characteristics for the look or sound and feel based on the data of the creative brief schema record 202, the marketing data 134, and the historical brief data 402. In one or more implementations, the creative brief manager module 124 determines these characteristics using machine learning. Based on the determined characteristics, the creative brief manager module 124 can generate the mockups 130 by identifying digital content components from the stock 132 content. Once digital content components are identified, the creative brief manager module 124 can apply content post-processing techniques to the identified content (e.g., cropping, filtering, zooming, content removal) and incorporate additional digital content (e.g., text, audio layers, logos).

An advantage of the generated mockups is that they can serve as inspiration to content creators, such that when presented to a content creator a mockup aids content creation by triggering an emotional response, reminding the content creator of an intended look or sound and feel of the creative project, serving as a template from which to create the digital content, and so forth. In one or more implementations, the creative brief manager module 124 is also configured to create negative mockups, which can represent digital content that is not to be created. Negative mockups are generated to have characteristics that are determined to be opposite of the characteristics the content created in connection with the creative brief 120 is to have. The characteristics of the negative mockups can also be predicted to cause a lowest conversion among the demographic segments indicated by the audience demographics data 220, to cause a worst performance in relation to the expected performance indicated by the expected creative performance data 212, and so forth. Negative mockups may also serve to inspire content creators, such as by causing the content creators to consider the problem of content creation differently than previously considered.

In the illustrated example 400, the brief-based content 122 includes creative brief suggestions 410, created content score 412, mockup 414, and negative mockup 416. This brief-based content 122 represents the digital content that is generated using the functionality of the above-described modules. For example, the creative brief suggestions 410 are generated using the functionality of the brief attribute suggestion module 404, the created content score 412 is generated using the functionality of the content score module 406, and the mockup 414 and the negative mockup 416 are generated using the functionality of the mock content generation module 408. The mockup 414 and the negative mockup 416 are examples of the mockups 130 maintained as part of the digital content 126. The brief-based content 122 may include different data than illustrated without departing from the spirit or scope of the techniques described herein, such as multiple mockups 414, multiple negative mockups 416, no negative mockups 416, multiple different types of created content scores 412, different created content scores 412 for different content items being created in association with the creative brief 120, and so on.

Additionally, the creative brief manager module 124 is configured to update the brief-based content 122 as content items are modified. For example, the creative brief manager module 124 can compute an updated created content score 412 for a digital content item responsive to a modification made to the digital content item, e.g., via the content editing application 118. In one or more implementations, the created content score 412 can be generated to indicate a prediction regarding how the content being created will perform with different demographic segments, e.g., demographic groups indicated by the audience demographics data 220. Alternately or in addition, the created content score can indicate how the content being created is predicted to perform with other segments, such as segments selected by a device user, predefined demographic segments, and so forth.

Similarly, the creative brief manager module 124 can generate different mockups 130 responsive to receiving new marketing data indicating different responses to digital content by demographic segments. The creative brief manager module 124 can also generate different mockups 130 responsive to a change of the creative brief schema record 202, e.g., resulting from user input to the brief interface 302. Regardless, the brief-based content 122 is surfaced to aid a client device user with creating content in connection with the creative brief 120. In this context, consider FIG. 5.

Figure 5:
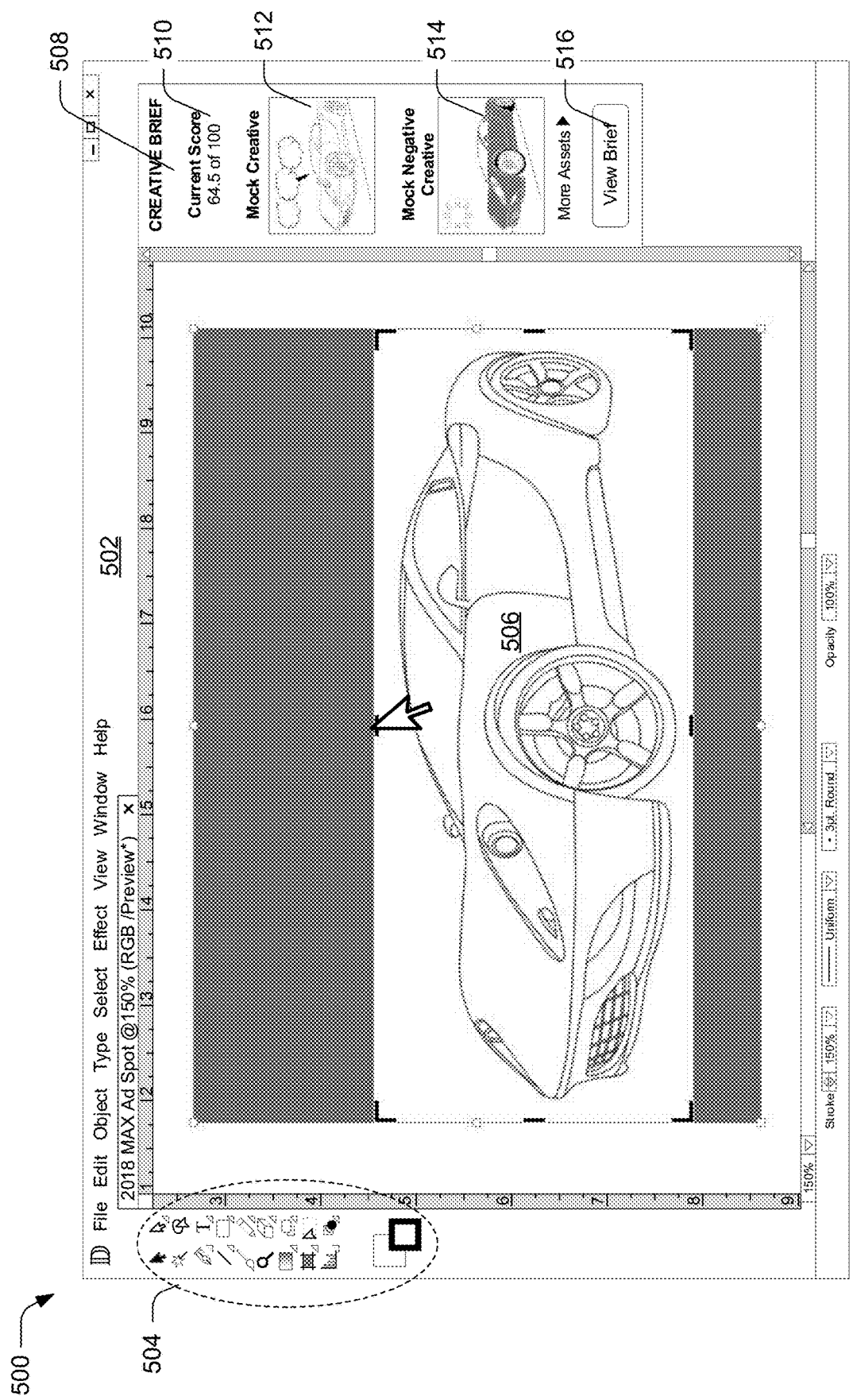
FIG. 5 depicts an example user interface that is configured to present creative-brief based content in relation to content being created.

FIG. 5 depicts an example 500 of a user interface that is configured to present creative-brief based content in relation to content being created.

The illustrated example 500 includes graphical user interface 502, which is depicted having a variety of tools 504 that are selectable to perform a variety of actions with respect to digital content item 506. The graphical user interface 502 may be a graphical user interface of the content editing application 118, for example.

The illustrated example 500 also includes brief-based content portion 508. The brief-based content portion 508 is configured to present portions of the brief-based content 122 while a device user edits digital content for a respective creative project. In the illustrated example 500, the brief-based content portion 508 includes content score 510, mockup 512, and negative mockup 514. The content score 510, the mockup 512, and the negative mockup 514 may correspond to the created content score 412, the mockup 414, and the negative mockup 416, respectively. The brief-based content portion 508 also includes view brief instrumentality 516, which is user selectable to present the corresponding creative brief 120. For instance, selection of the view brief instrumentality 516 may cause the brief interface 302 to be displayed by the client device 104. In one or more implementations, the brief-based content portion 508 also presents the various data of the creative brief schema record 202, such as to present a target demographic segment indicated by the audience demographics data 220.

Indeed, a brief-based content portion 508 of a user interface may be configured in different ways to present the brief-based content 122 without departing from the spirit or scope of the techniques described herein. For example, the user interface may include multiple brief-based content portions 508 that each present different items or different types of items of the brief-based content 122. Alternately or in addition, a brief-based content portion 508 may be surfaced based on different events, including opening the digital content item 506 with the content editing application 118, receiving input to make a modification to the digital content item 506, receiving a user selection that selects to present the brief-based content 122, and so on. By presenting the brief-based content 122 in a context in which a content creator is actually working on digital content, the described techniques assist users in creating more effective digital content. Accordingly, digital content created using the described techniques may result in better conversion metrics and better revenues than digital content created in connection with conventionally configured creative briefs.

Figure 6:
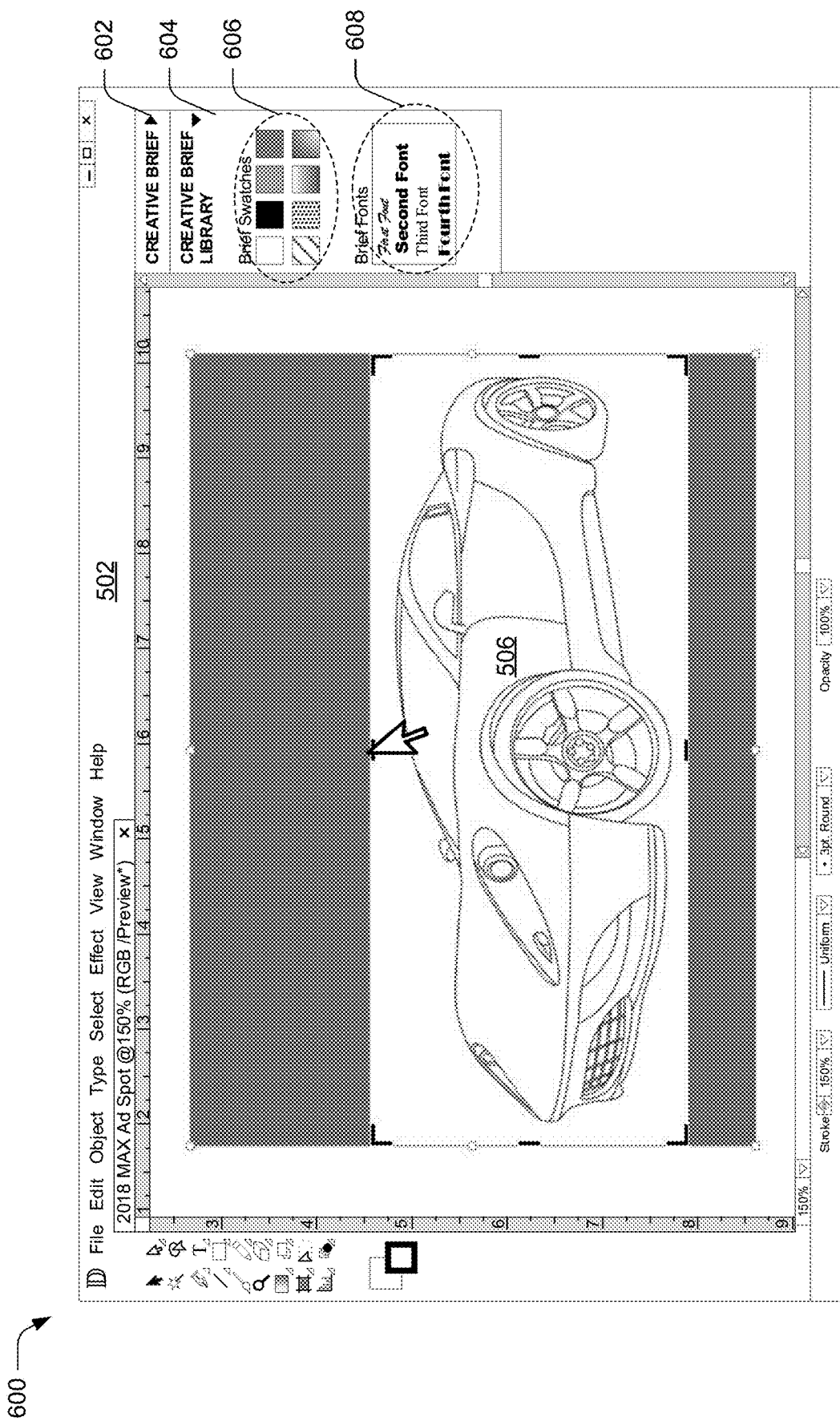
FIG. 6 depicts an example of the user interface configured to present a panel prepopulated with content-creation tools based on a creative brief that is associated with the content being created.

FIG. 6 depicts an example 600 of the user interface configured to present a panel prepopulated with content-creation tools based on a creative brief that is associated with the content being created.

The illustrated example 600 includes the user interface 502 of FIG. 5 as well as the digital content item 506. In contrast to the brief based portion 508 illustrated in FIG. 5, though, the illustrated example depicts collapsed brief based portion 602 and creative brief library panel 604. The collapsed brief based portion 602 corresponds to the brief based portion 508 of FIG. 5. In this example, however, the brief based portion 508 has been collapsed to take up less display space and is presented as the collapsed brief based portion 602. The collapsed brief based portion 602 may be selectable for expansion to display as the brief based portion 508.

The creative brief library panel 604 is depicted with brief swatches 606 and brief fonts 608. The brief swatches 606 and the brief fonts 608 may correspond to information described by attributes of the creative brief schema record 202 associated with the digital content item 506, such as the aesthetic/brand image data 230. For instance, the brief swatches 606 may correspond to attributes described by the color schema and palette data 232. Similarly, the brief fonts 608 may correspond to font data (not shown) of the aesthetic/brand image data 230. Broadly speaking, the brief swatches 606 represent selectable interface instrumentalities for formatting objects of the digital content item 506. Similarly, the brief fonts 608 represent selectable interface instrumentalities for formatting text incorporated into the digital content item 506.

In one or more implementations, the brief swatches 606 and the brief fonts 608 are automatically prepopulated into the user interface 502, e.g., based on association of the digital content item 506 with a creative brief configured according to the described techniques. By comparison, when the user interface 502 is presented in connection with digital content not associated with a creative brief configured according to the described techniques, the user interface 502 does not include the creative brief library panel 604. Instead, the user interface 502 may include panels with personal libraries of a client device user, panels with default libraries of the application, no such panels, and so on. Further, the creative brief library panel 604 may be configured differently for different creative briefs, e.g., to have different brief swatches 606, different brief fonts 608, different instrumentalities for different content editing operations governed by the creative brief, and so on.

In one or more implementations, a creative brief library panel may be configured to include content components that can be incorporated into digital content. Examples of content components include a logo that can be overlayed on a background layer, an edited photographic image that can serve as a background or a portion of the digital content, a text block that can be overlayed on a background layer (e.g., having a formatted slogan), and so forth. Alternately or in addition, a creative brief library may be configured to include different brushes that can be used to modify the digital content. The data of the respective schema-based creative brief is used to populate these library panels. Indeed, the creative brief library panel 604 may be configured in various ways based on the data of the respective creative brief schema record without departing from the spirit or scope of the techniques described herein.

Also related to this ability to populate library panels in content creation applications is functionality to receive requests and present previously-created digital content that matches one or more of the attributes of a current creative brief, e.g., a creative brief of content a user is currently editing, a creative brief a user is currently editing, and so forth. The client device 104 and the creative service system 106 can be configured to leverage schema-based creative briefs to present the digital content matching one or more attributes of a current creative brief (or present digital content matching one or more attributes selected by a client device user). Additionally or alternately, standardizing creative briefs according to a schema enables an application (e.g., the content editing application 118, a network-enabled application, etc.) to request and present historical analytics and future predictions regarding performance of previously created digital content items. This also enables these applications to present information regarding how well the previously created digital content is predicted to perform in the context of a current brief's constraints and intent, as described by the standardized data.

Having discussed example details of the techniques for creative brief-based content creation, consider now some example procedures to illustrate additional aspects of the techniques.

Example Procedures

This section describes example procedures for creative brief-based content creation in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the creative service system 106, the service provider system 102, or the client device 104 that makes use of the communication module 116.

Figure 7:
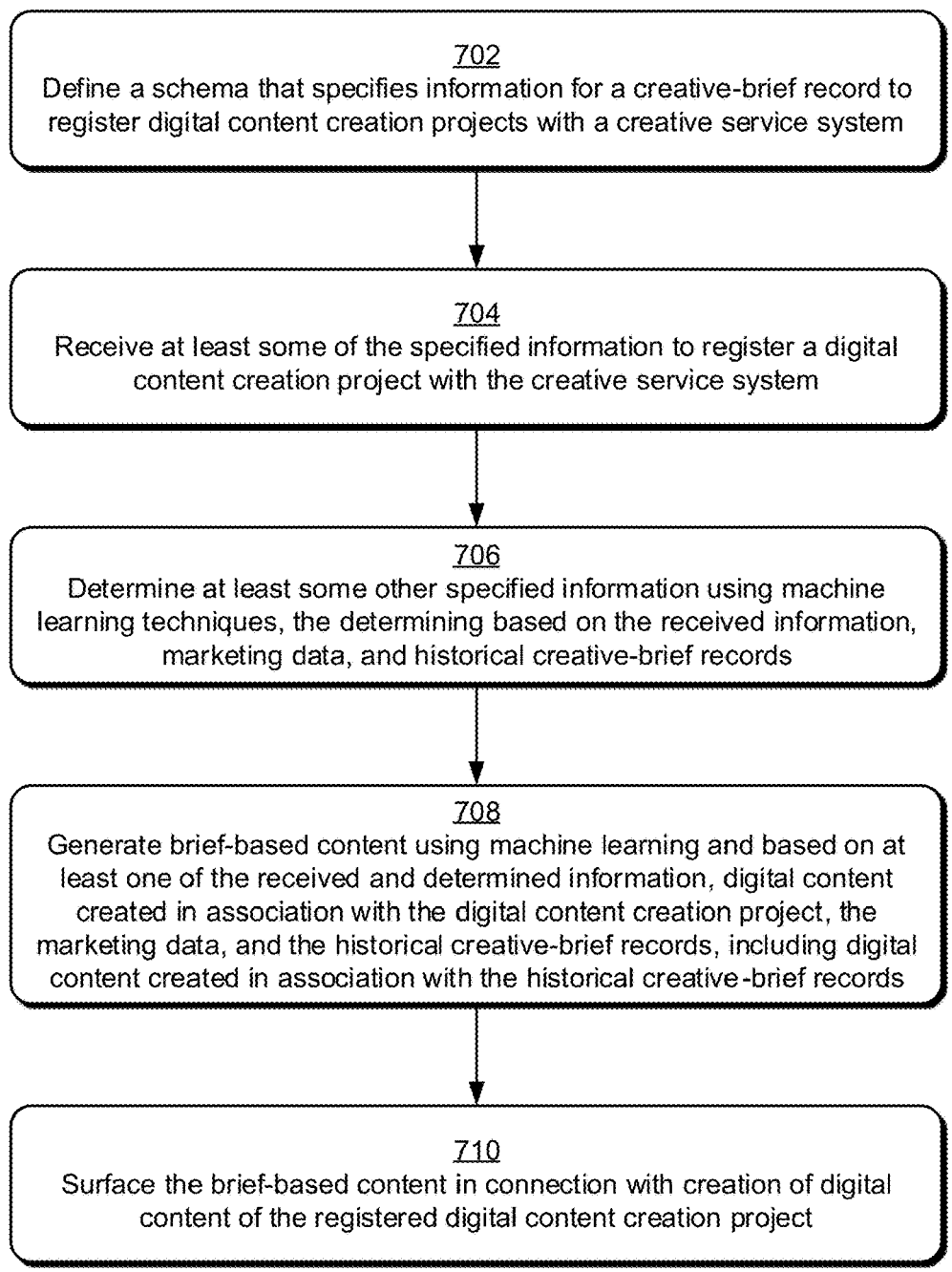
FIG. 7 depicts a procedure in an example implementation in which a digital content creation project is registered with a creative service system.

FIG. 7 depicts an example procedure 700 in which a digital content creation project is registered with a creative service system.

A schema is defined that specifies information of a creative brief record for registering digital content creation projects with a creative service system (block 702). For example, a schema that specifies the information of the creative brief schema record 202 is defined. At least some of the specified information is received to register a digital content creation project with the creative service system (block 704). For example, the creative service system 106 receives the creative brief 120, which is configured according to the creative brief schema record 202. Further, the received creative brief 120 includes at least some of the information specified by the creative brief schema record 202, such as the brief name data 206, the associated product/service data 208, the creative spend data 210, the intent data 214, and the aesthetic/brand image data 230.

Other specified information of the creative-brief record is determined using machine learning techniques (block 706). In accordance with the principles discussed herein, the other specified information is determined based on the received information marketing data, and historical creative-brief records. By way of example, the creative brief manager module 124 trains a neural network based on the marketing data 134 and the historical brief data 402. Further, the creative brief manager module 124 leverages a trained neural network to determine at least some of the other information specified by the creative brief schema record 202, e.g., information not instantiated in the creative brief received at block 704. In the continuing example, the creative brief manager module 124 leverages functionality of the neural network to determine the expected creative performance data 212 and the audience demographics data 220. In this example, the neural network determines this data based, in part, on the information received at block 704.

Brief-based content is generated using machine learning techniques and based on at least one of the received and determined information, digital content created in association with the digital content creation project, the marketing data, and the historical creative-brief records (block 708). In accordance with the principles discussed herein, this includes digital content created in association with the historical creative-brief records. By way of example, the creative brief manager module 124 utilizes machine learning (e.g., a trained neural network) to generate the brief-based content 122. The machine learning generates the brief-based content 122 based on the information received at block 704, the information determined at block 706, the marketing data 134, and the historical brief data 402, which includes digital content created in association therewith.

In one or more implementations, the machine learning learns how digital content having certain characteristics performs with different demographic segments. The machine learning can thus predict how content having certain characteristics will perform with different audiences. Based on this, the creative brief manager module 124 generates digital mockups of content having characteristics that are predicted to perform better with one or more of these audiences than other characteristics. Additionally, the machine learning enables the creative brief manager module 124 to generate digital negative mockups of content that have other characteristics that are predicted to perform differently with the audience than the characteristics of the mockup content, e.g., perform worse with a given demographic segment, perform better with a different demographic segment, and so forth.

The brief-based content is surfaced in connection with creation of digital content associated with the registered digital content creation project (block 610). By way of example, the creative brief manager module 124 communicates the brief-based content 122 to the client device 104. The client device 104 outputs the brief-based content 122 for presentation to a user, such as by displaying the brief-based content 122 via the brief-based content portion 508 of the graphical user interface 502.

Figure 8:
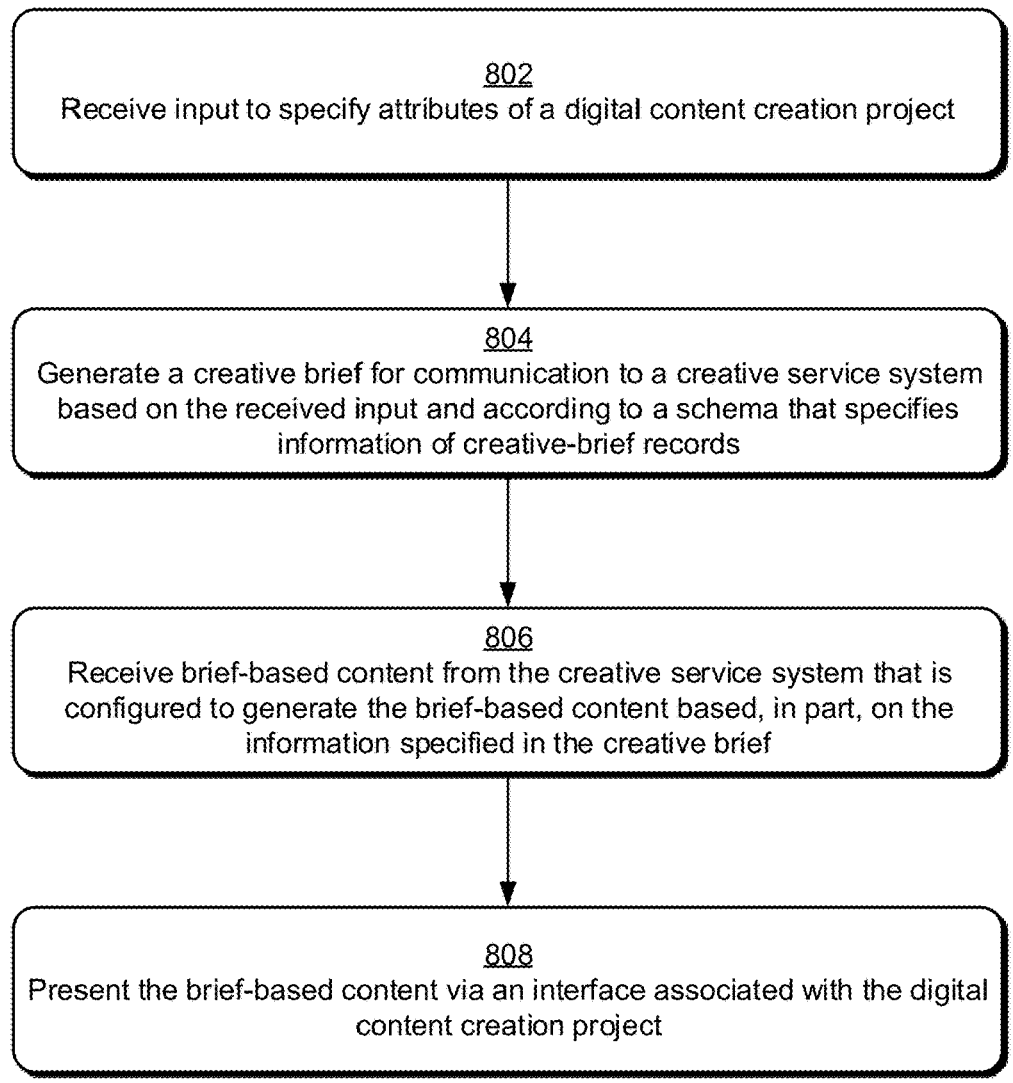
FIG. 8 depicts a procedure in an example implementation in which a creative service system is used to provide creative-brief based content in connection with a digital content creation project.

FIG. 8 depicts an example procedure 800 in which a creative service system is used to provide creative-brief based content in connection with a digital content creation project.

Input is received to specify attributes of a digital content creation project (block 802). By way of example, input is received by the client device 104 via the brief interface 302 to specify attributes for a digital content creation project. For instance, input is received via the file attachment instrumentality 304 to associate a document with the digital content project. In this example, information is extracted from the attached document to specify the attributes, such as to specify a name for the digital content creation project. This extracted name information is used to instantiate the brief name data 206. Alternately or in addition, user input is received via the brief name instrumentality 308 to specify a name for the digital content creation project. Other attributes are specified by extracting them from an attached document and/or user input received via instrumentalities of the brief interface 302.

A creative brief is generated for communication to a creative service system based on the received input (block 804). In accordance with the principles discussed herein, the creative brief is further generated according to a schema that specifies information for creative-brief records. By way of example, the client device 104 (or some module associated with the content editing application 118) generates the creative brief 120 for communication to the creative service system 106. In particular, the client device 104 (or module) generates the creative brief 120 based on the input received at block 802 and according to the schema defined at block 702.

Brief-based content is received from the creative service system (block 806). In accordance with the principles discussed herein, the creative service system is configured to generate the brief-based content based, in part, on the information specified in the creative brief By way of example, the client device 104 receives the brief-based content 122 from the creative service system 106, which is configured to leverage the functionality of the creative brief manager module 124. In particular, the creative service system 106 leverages the functionality of the creative brief manager module 124 to generate the brief-based content 122 based on the information in the creative brief 120, as described in relation to FIG. 7.

The brief-based content is presented via an interface associated with the digital content creation project (block 808). The client device 104 outputs the brief-based content 122 for presentation to a user, such as by displaying the brief-based content 122 via the brief-based content portion 508 of the graphical user interface 502.

Having described example procedures in accordance with one or more implementations, consider now an example system and device that can be utilized to implement the various techniques described herein.

Example System and Device

Figure 9:
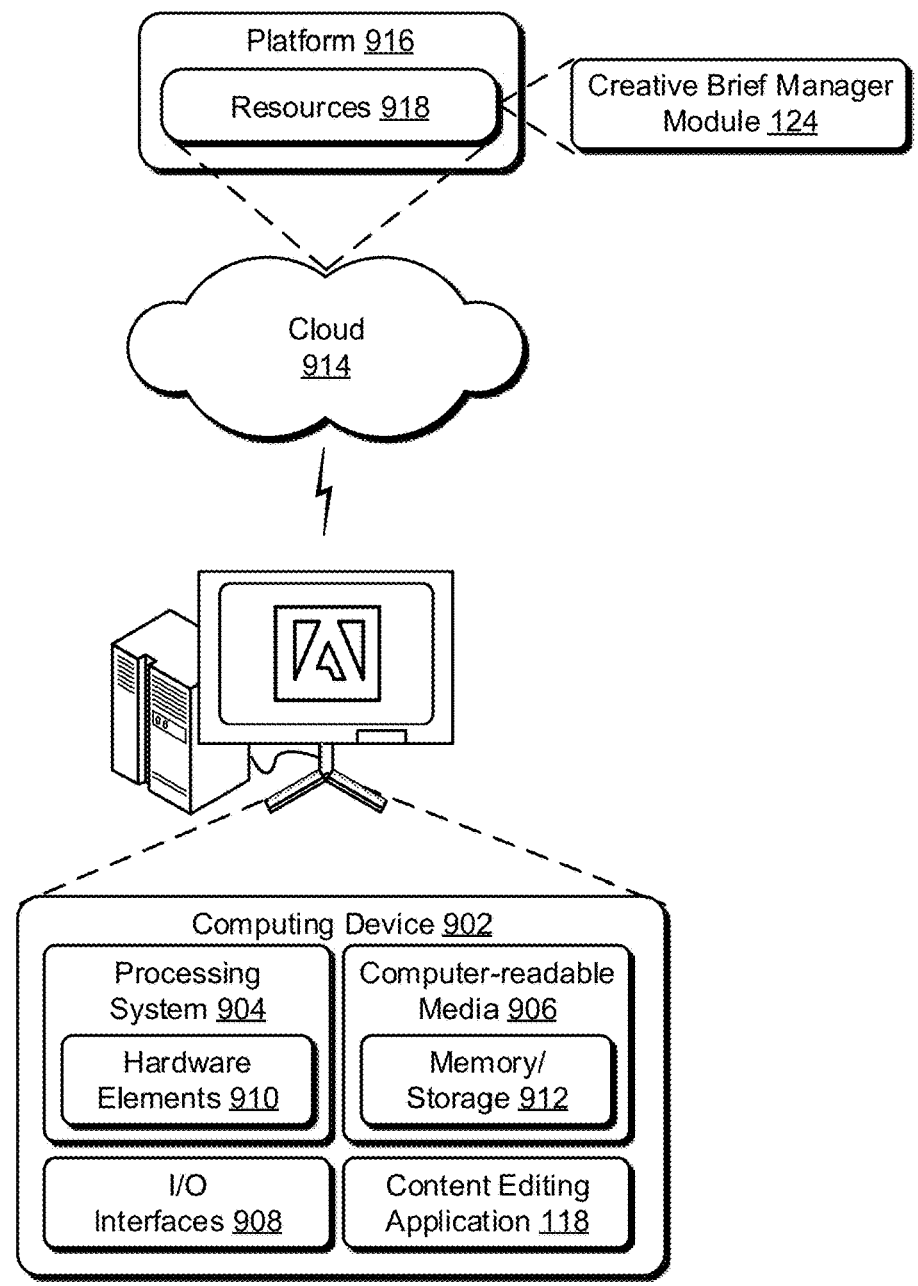
FIG. 9 illustrates an example system including various components of an example device that can be implemented as any type of computing device as described and/or utilized with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the content editing application 118 and the creative brief manager module 124. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to support digital content creation based on a creative brief, a method implemented by at least one computing device, the method comprising:

receiving, by the at least one computing device, a creative brief including data describing a digital content creation project;

standardizing the creative brief to have a format according to a creative brief schema associated with a particular service provider to form a standardized creative brief, the creative brief schema deployed by the particular service provider in connection with providing a service supporting digital content creation in a digital content editing application by using standardized creative briefs;

generating, by the at least one computing device, a brief-based prediction regarding how a current version of digital content, while the current version of digital content is being modified within the digital content editing application, is predicted to perform with an audience of client device users, the current version of digital content being modified in connection with the digital content creation project, the brief-based prediction generated using machine learning and based on the data describing the digital content creation project from the standardized brief; and generating, by the at least one computing device and based on the brief-based prediction, additional digital content for presentation via the digital content editing application at a client device while the current version of the digital content is being modified.

2. A method as described in claim 1, wherein the additional digital content comprises at least one of:
a digital mockup of content having characteristics predicted to perform better with the audience than at least one other characteristic according to the machine learning; or
a digital negative mockup of content having other characteristics predicted to perform differently with the audience than the characteristics of the digital mockup of content.

3. A method as described in claim 1, wherein the additional digital content comprises a content score indicative of the brief-based prediction.

4. A method as described in claim 1, wherein the machine learning uses a neural network to generate the brief-based prediction.

5. A method as described in claim 4, further comprising training the neural network to predict how digital content created in connection with digital content projects performs with different audiences of client device users.

6. A method as described in claim 1, wherein generating the brief-based prediction is further based on marketing data describing client-device user interactions with different digital content.

7. A method as described in claim 1, wherein generating the brief-based prediction is further based on creative brief data associated with at least one different digital content creation project.

8. A method as described in claim 1, wherein the presentation comprises output via an interface of the digital content editing application of the client device.

9. A method as described in claim 1, wherein the additional digital content is configured for presentation via interfaces of at least two different digital content editing applications.

10. A system comprising:
at least one processor; and
memory having stored thereon computer-readable instructions that are executable by the at least one processor to perform operations for implementing a creative service provider providing a service for digital content creation based on a creative brief, the operations comprising:
using machine learning to learn how digital content having different characteristics performs with different audiences of client-device users;
associating an audience of the client-device users with a digital content creation project based on data of a creative brief describing the digital content creation project, the creative brief having a standardized format controlled by a creative brief schema, the creative brief schema deployed by the creative service provider in connection with providing the service for digital content creation in a digital content editing application by using standardized creative briefs;
generating a brief-based prediction regarding how the different characteristics of a current version of the digital content, while the current version of the digital content is being modified within the digital content editing application, are predicted to perform with the associated audience according to the machine learning; and
generating, based on the brief-based prediction, additional digital content for presentation via the digital content editing application while the current version of the digital content is being modified.

11. A system as described in claim 10, wherein the operations further comprise:
determining which of the different characteristics are included in a digital content component of the digital content creation project; and
generating the additional digital content as a score indicative of how the determined characteristics perform with the associated audience based on the brief-based prediction.

12. A system as described in claim 10, wherein generating the brief-based prediction is further based on at least one of:
marketing data describing client-device user interactions with the digital content having the different characteristics;
creative brief data associated with at least one different digital content creation project; or
the digital content created in connection with the digital content creation project.

13. A system as described in claim 10, wherein the data of the creative brief used to associate the audience of client device users with the digital content creation project comprises audience data indicating at least one marketing segment associated with the digital content creation project.

14. In a digital medium environment to receive support in connection with digital content creation, a method implemented by at least one computing device, the method comprising:
launching, by the at least one computing device, a content editing application to edit digital content;
determining, by the at least one computing device, that the digital content while the digital content is being modified in the content editing application, is associated with a digital content creation project based on a brief identifier included with the digital content, the brief identifier uniquely identifying a creative brief describing the digital content creation project from other digital content creation projects and from information associated with the other digital content creation projects via respective brief identifiers;
receiving, by the at least one computing device, additional digital content to support creation of the digital content while the digital content is modified in the content editing application and from a creative service provider system configured to generate the additional digital content based on the creative brief; and
outputting, by the at least one computing device, the additional digital content via a user interface of the content editing application while the user interface is presented in connection with use of the content editing application for editing the digital content.

15. A method as described in claim 14, wherein:
the user interface is configured for display via a display device associated with the at least one computing device; and
the user interface is further configured to facilitate user interactions for the editing of the digital content with at least one content editing tool.

16. A method as described in claim 14, wherein the brief identifier is a random global unique identifier (GUID).

17. A method as described in claim 1, wherein standardizing the creative brief includes registering the digital content creation project with the particular service provider providing the service.

18. A method as described in claim 1, further comprising causing presentation via the client device of a brief-based content portion of a user interface that includes the additional digital content, the brief-based content portion presented responsive to user input to modify the current version of the digital content.

19. A method as described in claim 1, wherein the brief-based prediction regarding how the current version of digital content is predicted to perform is based on conversion-causing characteristics of historical digital content and characteristics of the current version of the digital content.

20. A method as described in claim 19, wherein the conversion-causing characteristics of the historical digital content and the characteristics of the current version of the digital content include at least one of font characteristics and characteristics indicative of a look of digital visual content.

* * * * *